(12) United States Patent
Bulpett et al.

(10) Patent No.: US 7,358,308 B2
(45) Date of Patent: Apr. 15, 2008

(54) COMPOSITIONS FOR USE IN GOLF BALLS

(75) Inventors: David A. Bulpett, Boston, MA (US); Derek A. Ladd, Acushnet, MA (US)

(73) Assignee: Acushnet Company, Fairhaven, MA (US)

( * ) Notice: Subject to any disclaimer, the term of this patent is extended or adjusted under 35 U.S.C. 154(b) by 199 days.

(21) Appl. No.: 11/173,284

(22) Filed: Jul. 1, 2005

(65) Prior Publication Data

US 2005/0245652 A1 Nov. 3, 2005

Related U.S. Application Data

(63) Continuation-in-part of application No. 10/867,079, filed on Jun. 14, 2004, now Pat. No. 7,030,192, which is a continuation-in-part of application No. 10/437,694, filed on May 14, 2003, now abandoned, which is a continuation-in-part of application No. 09/951,963, filed on Sep. 13, 2001, now Pat. No. 6,635,716.

(60) Provisional application No. 60/689,901, filed on Jun. 13, 2005.

(51) Int. Cl.
*A63B 37/06* (2006.01)
*A63B 37/00* (2006.01)
*C08K 5/375* (2006.01)

(52) U.S. Cl. ............... 525/245; 525/255; 525/256; 525/259; 525/260; 525/261; 525/274; 524/392; 524/393; 473/371; 473/372; 473/377

(58) Field of Classification Search ............... None
See application file for complete search history.

(56) References Cited

U.S. PATENT DOCUMENTS

| | | | |
|---|---|---|---|
| 4,955,966 A | 9/1990 | Yuki et al. | |
| 5,082,285 A | 1/1992 | Hamada et al. | |
| 5,093,402 A | 3/1992 | Hashimoto et al. | |
| 5,252,652 A | 10/1993 | Egashira et al. | |
| 5,586,950 A * | 12/1996 | Endo ................ | 473/356 |
| 5,605,968 A | 2/1997 | Egashira et al. | |
| 5,697,856 A | 12/1997 | Moriyama et al. | |
| 5,711,723 A | 1/1998 | Hiraoka et al. | |
| 5,776,012 A | 7/1998 | Moriyama et al. | |
| 5,779,563 A | 7/1998 | Yamagishi et al. | |
| 5,816,944 A | 10/1998 | Asakura et al. | |
| 5,872,185 A | 2/1999 | Ichikawa et al. | |
| 5,877,264 A | 3/1999 | Logothetis et al. | |
| 5,902,121 A | 5/1999 | Goto | |
| 5,919,101 A | 7/1999 | Yokota et al. | |
| 5,929,171 A | 7/1999 | Sano et al. | |
| 5,935,021 A | 8/1999 | Kashiwagi et al. | |
| 5,977,264 A | 11/1999 | Ichikawa et al. | |

(Continued)

FOREIGN PATENT DOCUMENTS

JP 2002035165 * 2/2002

OTHER PUBLICATIONS

Thain, Science and Golf IV, Jul. 2002; pp. 319-327.*

*Primary Examiner*—David J. Buttner
(74) *Attorney, Agent, or Firm*—Mandi B. Milbank

(57) ABSTRACT

A golf ball comprising a core, an outer cover layer, and, optionally, an intermediate layer disposed between the core and the outer cover layer is presently disclosed. At least one layer of the golf ball is formed from a composition comprising a base polymer, a crosslink initiator, and at least one additive having a structure of:

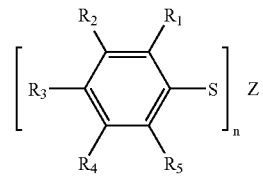

where at least one of $R_1$ to $R_5$ is selected from perhaloalkyls, (per)haloaryls, (per)haloaralkyls, (per)haloalkaryls, and (per)halocycloalkyls; the remainder of $R_1$ to $R_5$ are the same or different organic substituents or hydrogen; n is an integer of 1 or greater; and Z is selected from metal cations, organometallic cations, and non-metal cations, and, when n is 1, Z may also be selected from hydrogen and halogens;

or a structure of:

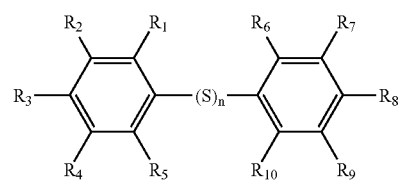

where at least one of $R_1$ to $R_5$ and at least one of $R_6$ to $R_{10}$ is selected from perhaloalkyls, (per)haloaryls, (per) haloaralkyls, (per)haloalkaryls, and (per)halocycloalkyls; the remainder of $R_1$ to $R_{10}$ are the same or different organic substituents or hydrogen; and n is an integer of 1 or greater.

The outer cover layer may comprise a polyurethane or polyurea composition. At least one portion of the golf ball comprises a composition that enhances physical properties and/or performance characteristics (e.g., coefficient of restitution) of the golf ball. Preferably, the coefficient of restitution of the core is 0.8 or greater.

7 Claims, 2 Drawing Sheets

U.S. PATENT DOCUMENTS

| | | | |
|---|---|---|---|
| 5,994,472 | A | 11/1999 | Egashira et al. |
| 6,111,000 | A | 8/2000 | Materne et al. |
| 6,120,392 | A | 9/2000 | Kashiwagi et al. |
| 6,121,357 | A | 9/2000 | Yokota |
| 6,126,558 | A | 10/2000 | Higuchi et al. |
| 6,129,640 | A | 10/2000 | Higuchi et al. |
| 6,135,898 | A | 10/2000 | Higuchi et al. |
| 6,162,135 | A | 12/2000 | Bulpett et al. |
| 6,174,247 | B1 | 1/2001 | Higuchi et al. |
| 6,184,301 | B1 | 2/2001 | Shindo et al. |
| 6,210,292 | B1 | 4/2001 | Higuchi et al. |
| 6,213,896 | B1 | 4/2001 | Higuchi et al. |
| 6,229,039 | B1 | 5/2001 | Materne et al. |
| 6,231,460 | B1 | 5/2001 | Higuchi et al. |
| 6,241,625 | B1 | 6/2001 | Yokota et al. |
| 6,244,978 | B1 | 6/2001 | Higuchi et al. |
| 6,248,028 | B1 | 6/2001 | Higuchi et al. |
| 6,267,692 | B1 | 7/2001 | Higuchi et al. |
| 6,267,694 | B1 | 7/2001 | Higuchi et al. |
| 6,287,218 | B1 | 9/2001 | Ohama |
| 6,291,592 | B1 | 9/2001 | Bulpett et al. |
| 6,299,551 | B1 | 10/2001 | Higuchi et al. |
| 6,315,683 | B1 | 11/2001 | Yoshida et al. |
| 6,386,993 | B1 | 5/2002 | Yokota |
| 6,417,278 | B1 | 7/2002 | Ladd et al. |
| 6,458,895 | B1 | 10/2002 | Wrigley et al. |
| 6,465,578 | B1 | 10/2002 | Bissonnette et al. |
| 6,486,261 | B1 | 11/2002 | Wu et al. |
| 6,500,495 | B2 | 12/2002 | Lutz |
| 6,555,627 | B2 | 4/2003 | Bissonnette et al. |
| 6,558,275 | B2 | 5/2003 | Ohama |
| 6,558,276 | B1 | 5/2003 | Yokota et al. |
| 6,561,925 | B2 | 5/2003 | Watanabe et al. |
| 6,561,926 | B2 | 5/2003 | Hayashi et al. |
| 6,561,929 | B2 | 5/2003 | Watanabe |
| 6,575,848 | B2 | 6/2003 | Bissonnette et al. |
| 6,579,939 | B2 | 6/2003 | Ichikawa et al. |
| 6,583,229 | B2 | 6/2003 | Mano et al. |
| 6,596,801 | B2 | 7/2003 | Higuchi et al. |
| 6,602,941 | B2 | 8/2003 | Higuchi et al. |
| 6,616,549 | B2 | 9/2003 | Dalton et al. |
| 6,626,770 | B2 | 9/2003 | Takemura et al. |
| 6,634,961 | B2 | 10/2003 | Higuchi et al. |
| 6,635,716 | B2 | 10/2003 | Voorheis et al. |
| 6,660,784 | B2 | 12/2003 | Ibaragi et al. |
| 6,713,565 | B2 | 3/2004 | Burkhart et al. |
| 6,758,766 | B2 | 7/2004 | Watanabe |
| 2002/0098915 | A1* | 7/2002 | Cavallaro et al. ........... 473/354 |
| 2002/0137849 | A1 | 9/2002 | Kerns et al. |
| 2003/0144425 | A1 | 7/2003 | Mano |

* cited by examiner

COMPOSITIONS FOR USE IN GOLF BALLS

CROSS REFERENCE TO RELATED APPLICATIONS

This application is a continuation-in-part of U.S. application Ser. No. 10/867,079, filed Jun. 14, 2004, now U.S. Pat. No. 7,030,192 which is a continuation-in-part of U.S. application Ser. No. 10/437,694, filed May 14, 2003, now abandoned which is a continuation-in-part of U.S. application Ser. No. 09/951,963, now U.S. Pat. No. 6,635,716, filed Sep. 13, 2001. This application further claims priority to U.S. provisional application No. 60/689,901, filed Jun. 13, 2005.

FIELD OF THE INVENTION

This invention relates generally to golf balls and, in particular, golf ball portions (e.g., cores) formed of a polymer composition including one or more functional additives.

BACKGROUND

Conventional golf balls can be divided into two general classes: solid (i.e., non-wound) and wound. Solid golf balls include one-piece, two-piece (i.e., solid core and a cover), and multi-layer (i.e., solid core of one or more layers and/or a cover of one or more layers) golf balls. Wound golf balls typically include a solid, hollow, or fluid-filled center, surrounded by a tensioned elastomeric material, and a cover. Solid balls have traditionally been considered longer and more durable than wound balls, but also lack a particular "feel" provided by the wound construction.

By altering ball construction and composition, manufacturers can vary a wide range of playing characteristics, such as compression, velocity, and spin, each of which can be optimized for various playing abilities. One golf ball component, in particular, that many manufacturers are continually looking to improve is the center or core. The core becomes the "engine" of the golf ball when hit with a club head. Generally, golf ball cores and/or centers are constructed with a polybutadiene-based polymer composition. Compositions of this type are constantly being altered in an effort to provide a higher coefficient of restitution ("CoR") while at the same time resulting in a lower compression which, in turn, can lower the golf ball spin rate, provide better "feel," or both. This is a difficult task, however, given the physical limitations of currently-available polymers. As such, there remains a need for novel and improved golf ball core compositions.

SUMMARY OF THE INVENTION

The present disclosure is directed to a golf ball comprising a core and at least one layer disposed about the core. The core is preferably solid, having a first coefficient of restitution and a first compression. At least one of the core or the layer comprises composition formed from a base polymer, a crosslink initiator, and at least one additive that enhances the first coefficient of restitution and/or reduces the first compression. The additive may be present in an amount of 0.1 phr to 5 phr by weight of the base polymer.

Preferably, the additive has a structure of

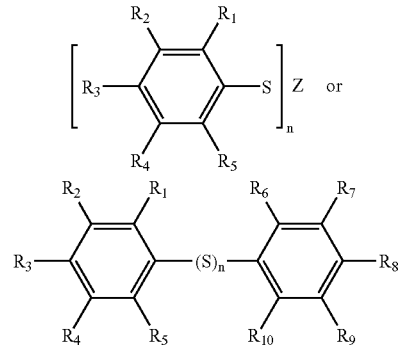

where at least one of $R_1$ to $R_5$ is a perhaloalkyl, (per)halocycloalkyl, or (per)haloaryl substituent; the remainder of $R_1$ to $R_5$, if any, are the same or different organic substituents; Z is H or a cation; and n is an integer of 1 or greater. More preferably, at least one of $R_1$, $R_3$, and $R_5$ is a perhaloalkyl substituent having 1 to 6 carbon atoms. Further preferably, at least one of $R_6$, $R_8$, and $R_{10}$ is a perhaloalkyl substituent having 1 to 6 carbon atoms. Non-limiting examples of suitable perhaloalkyl substituents include trifluoromethyl, trichloromethyl, tribromomethyl, and triiodomethyl. Non-limiting examples of suitable Z include H, Li, Na, K, Cs, Be, Mg, Ca, Sr, Ba, Ti, Zr, Cr, Mo, Fe, Co, Rh, Ni, Pd, Pt, Cu, Ag, Zn, Cd, organometallic cations, and non-metal organic cations.

The composition may further comprise at least one component chosen from metal salts of unsaturated acids having 3 to 8 carbon atoms, fillers, fatty acids and salts thereof. The core or the golf ball, or both, may have a coefficient of restitution of 0.8 or greater. The core may have a diameter of 1.5 inches or greater, preferably 1.53 inches or greater. The core may have a compression of 50 to 90, or 45-80, preferably 45-70. The core may comprise a center and an outer core layer. The at least one layer may be an outer cover layer having a thickness of 0.05 inches or less and a flexural modulus of 2,000 psi to 30,000 psi, preferably formed from a polyurethane or polyurea, or be an intermediate layer, no thicker than 0.05 inches, disposed between the core and an outer cover layer.

DEFINITIONS

Any numeric references to amounts, unless otherwise specified, are "by weight." The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer.

The subscript letters such as m, n, x, y, and z used herein within the generic structures are understood by one of ordinary skill in the art as the degree of polymerization (i.e., the number of consecutively repeating units). In the case of molecularly uniform products, these numbers are commonly integers, if not zero. In the case of molecularly non-uniform products, these numbers are averaged numbers not limited to integers, if not zero, and are understood to be the average degree of polymerization.

As used herein, the term "polymer" refers to oligomers, adducts, homopolymers, random copolymers, pseudo-copolymers, statistical copolymers, alternating copolymers, periodic copolymer, bipolymers, terpolymers, quaterpolymers, other forms of copolymers, substituted derivatives thereof, and combinations of two or more thereof. These polymers can be linear, branched, block, graft, monodisperse, polydisperse, regular, irregular, tactic, isotactic, syndiotactic, stereoregular, atactic, stereoblock, single-strand, double-strand, star, comb, dendritic, and/or ionomeric.

As used herein, the term "telechelic" refers to polymers having at least two terminal reactive end-groups and capable of entering into further polymerization through these reactive end-groups. Reactive end-groups disclosed herein include, without limitation, amine groups, hydroxyl groups, isocyanate groups, carboxylic acid groups, thiol groups, and combinations thereof.

As referred to herein, lower alkyls and lower alkoxies include $C_{1-5}$, preferably $C_{1-3}$, alkyls and alkoxies, such as methyl, ethyl, n-propyl, isopropyl, n-butyl, sec-butyl, t-butyl, amyl, isoamyl, methoxy, ethoxy, isopropoxy, isobutoxy, t-butoxy.

As referred to herein, halogens include fluorine, chlorine, bromine, and iodine.

As referred to herein, linear or branched alkyls include methyl, ethyl, n-propyl, isopropyl, n-butyl, sec-butyl, t-butyl, amyl, isoamyl, n-hexyl, 2-ethyl-n-hexyl, n-heptyl, n-octyl, isooctyl, n-nonyl, isononyl, n-dodecyl.

As referred to herein, substituted alkyls include cyanoalkyl, haloalkyl, hydroxyalkyl, alkoxyalkyl, preferably $C_{2-6}$, e.g., β-cyanoethyl, β-chloroethyl, β-hydroxyethyl, β-methoxyethyl, β-ethoxyethyl. Cycloalkyls include cyclopentyl, cycloheptyl, cyclohexyl, and may comprise one or more $C_{1-4}$ alkyls.

As referred to herein, aralkyls and alkaryls include methylbenzyl, phenethyl, phenisopropyl, benzyl, and may be ring-substituted, such as with halogen, methyl, and/or methoxy, like p-methylbenzyl, o- or p-chlorobenzyl, o- or p-tolyl, xylyl, o-, m- or p-chlorophenyl, and o- or p-methoxyphenyl.

As referred to herein, heterocyclic radicals include pyrrolidinyl, piperidinyl, pipecolinyl, morpholinyl, thiomorpholinyl, piperazinyl (e.g., N-methylpiperazinyl).

As used herein, the term "derivatives" refers to various compounds chemically derivable from the parent compounds, typically sharing one or more chemical properties and/or reactivities with the parent compounds. When applicable, the derivatives of the compounds disclosed herein include, without limitation, substitution derivatives having one or more substituents, anhydrides, dimers, oligomers, esters such as alkyl (e.g., methyl, ethyl, linear or branched $C_{1-12}$ alkyls), cycloalkyl, and aryl esters, amides, halides, oxides, sulfides, and salts having metal cations (e.g., Na, K, Zn, Ca, Co, Mg, Ni), organometallic cations, and non-metal cations (e.g., quaternary ammonium, quaternary pyridinium, quaternary quinolinium, (organo)phosphonium, (organo)sulfonium, (organo)oxonium, (organo)iodonium, (organo)azonium).

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

For molecular weights, whether $M_n$ or $M_w$, these quantities are determined by gel permeation chromatography using polystyrene as standards as is well known to those skilled in the art and such as is discussed in U.S. Pat. No. 4,739,019 at column 4, lines 2-45, which is incorporated herein by reference in its entirety.

As used herein, the terms "polydispersity" and "dispersity" refer to the ratio of $M_w$ to $M_n$, an indicator of the degree of molecular weight distribution of a polymer and the extent to which the polymer chains share the same degree of polymerization. Polydispersity has a theoretical minimum of 1.0. A polymer having a polydispersity of less than 1.5, such as 1.35 or less, may be referred to as a monodispersed polymer.

As used herein, the terms "formed from" and "formed of" denote open, e.g., "comprising," claim language. As such, it is intended that a composition "formed from" or "formed of" a list of recited components be a composition comprising at least these recited components, and can further comprise other non-recited components during formulation of the composition.

As used herein, the term "cure" as used in connection with a composition, e.g., "a curable material," "a cured composition," shall mean that any crosslinkable components of the composition are at least partially crosslinked. In certain examples of the present disclosure, the degree of crosslinking can range from 5% to 100% of complete crosslinking. In other examples, the degree of crosslinking can range from 35% to 85% of full crosslinking. In other examples, the degree of crosslinking can range from 50% to 85% of full crosslinking. One-skilled in the art will understand that the presence and degree of crosslinking can be determined by a variety of methods, such as dynamic mechanical thermal analysis (DMTA) in accordance with ASTM E1640-99.

As used herein, the term "saturated" or "substantially saturated" means that the compound or material of interest is fully saturated (i.e., contains no double bonds, triple bonds, or aromatic ring structures), or that the extent of unsaturation is negligible, e.g. as shown by a bromine number in accordance with ASTM E234-98 of less than 10, or less than 5.

As used herein, the term "flexural modulus" or "modulus" refers to the ratio of stress to strain within the elastic limit (measured in flexural mode) of a material, indicates the bending stiffness of the material, and is similar to tensile modulus. Flexural modulus, typically reported in Pa or psi, is derived in accordance to ASTM D6272-02.

As used herein, the term "material hardness" refers to indentation hardness of non-metallic materials in the form of a flat slab or button as measured with a durometer. The durometer has a spring-loaded indentor that applies an indentation load to the slab, thus sensing its hardness. The material hardness can indirectly reflect upon other material properties, such as tensile modulus, resilience, plasticity, compression resistance, and elasticity. Standard tests for material hardness include ASTM D2240-02b. Unless otherwise specified, material hardness reported herein is in Shore D. Material hardness is distinct from the hardness of a golf ball portion as measured directly on the golf ball (or other spherical surface). The difference in value is primarily due to the construction, size, thickness, and material composition of the golf ball components (i.e., center, core and/or layers) that underlie the portion of interest. One of ordinary skill in the art would understand that the material hardness and the hardness as measured on the ball are not correlated or convertible.

As used therein, the term "compression," also known as "Atti compression" or "PGA compression," refers to points derived from a Compression Tester (ATTI Engineering Company, Union City, N.J.), a scale well known in the art for determining relative compression of a spherical object. Atti compression is approximately related to Riehle compression: Atti compression≈(160−Riehle compression). Compression is a property of a material as measured on a golf ball construction (i.e., on-ball property), not a property of the material per se.

As used herein, the term "coefficient of restitution" or "CoR" for golf balls or subassemblies thereof is defined as the ratio of a ball's rebound velocity to its initial incoming velocity when the ball is fired out of an air cannon into a stationary, steel plate which provides an impact surface weighing about 100 pounds or about 45 kilograms. The time periods, $T_{in}$ and $T_{out}$, of the ball flight between two separate ballistic light screens placed between the air cannon and the plate are measured to calculate $CoR=T_{out}/T_{in}$. The faster a golf ball rebounds, the higher the CoR it has, the more the total energy it retains when struck with a club, and the longer the ball flies. The reported CoR's initial velocity is about 50 ft/s to about 200 ft/s, and is usually understood to be 125 ft/s, unless otherwise specified. A golf ball may have different CoR values at different initial velocities.

A "Mooney" viscosity is a unit used to measure the plasticity of raw or unvulcanized rubber. The plasticity in a Mooney unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

As used herein and to conventional practice, the unit "phr" refers to "parts by weight of a respective material per 100 parts by weight of the base polymer or polymer blend."

DETAILED DESCRIPTION

Figure 1:
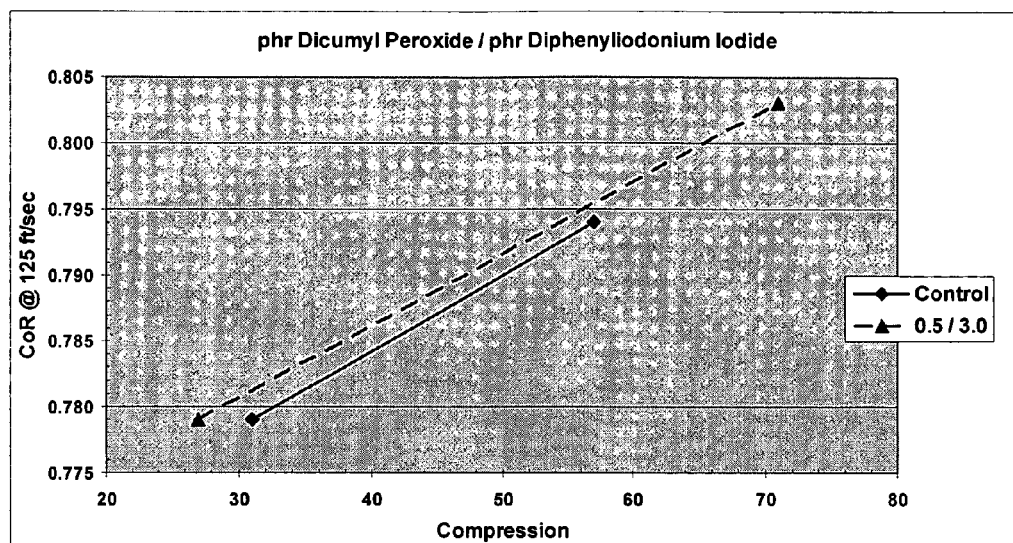
FIG. 1 is a plot comparing golf ball cores formed from compositions comprising diphenyliodonium iodide as disclosed herein to control cores with respect to compression and CoR.

The golf ball of the present invention may comprise any of a variety of constructions, but preferably includes a core and a layer (e.g., cover) surrounding the core. The core and/or the cover may have more than one layer, and one or more intermediate layers may be disposed between the core and the cover of the golf ball. For example, the core of the golf ball may comprise a conventional center surrounded by an intermediate or outer core layer disposed between the center and an inner cover layer, which is encased by an outer cover layer. The innermost portion of the core may be a liquid filled sphere, but preferably it is solid. As with the core, the intermediate layer or outer core layer may also comprise a plurality of layers. The core may also comprise a solid or liquid filled center around which one or more wound layers are disposed, each wound layer being formed from one or more tensioned elastomeric materials.

The materials suitable for solid cores or any golf ball layers may be thermoplastic, but preferably partially or fully crosslinked (e.g., thermoset), and include compositions comprising a base polymer (e.g., rubber, elastomer) or a blend of two or more base polymers, a crosslink initiator or a blend of two or more initiators, and, optionally, one or more additives (e.g., crosslink coagent, filler, organosulfur compound).

The base polymer or at least one polymer in the base polymer blend can be crosslinkable (e.g, comprising olefinic and/or acetylenic unsaturation), and include, without limitation, natural and synthetic rubbers (including various raw and reclaim forms), polyolefins, polyamides, polyesters, fluoropolymers, silicones, ionomers, and mixtures thereof. Rubbers and polyolefins include, without limitation, homopolymers and coplymers (including terpolymers and other complex copolymers, and can be random, block, or grafted types) of ethylene, propylene, butylenes, isobutylene, styrene, and/or dienes (simple dienes, allenes, conjugated dienes, e.g., 1,3-butadiene, 2-methyl-1,3-butadiene, 2,3-dimethyl-1,3-butadiene, chloroprene, 1,3-pentadiene, 1,5-hexadiene, 1,3-cyclohexadiene, 1,4-pentadiene, 1,4-cyclohexadiene, piperylene), optionally further comprising less than 50% of one or more other unsaturated monomers like acetylenes (e.g., vinyl acetylene), olefins (e.g., isobutylene), vinyls (e.g., acrylic acid, methacrylic acid, ethacrylic acid, propylacrylic acid, other alkylacrylic acids, $C_{1-6}$ alkyl esters of such acids, acrylonitrile, styrene, methylstyrene, vinyltoluene, divinylbenzene), vinyl esters, unsaturated aldehydes (e.g., acrolein), unsaturated ketones (e.g., methyl isopropenyl ketone), unsaturated ethers (e.g., vinyl ether), and others known to one skilled in the art. Non-limiting examples include polydienes such as neoprene, polybutadienes (BR, including cis-1,4-polybutadiene), polyisoprenes (including cis-1,4-polyisoprene), polyethylenes (PE), ethylene-propylene copolymers (EP), ethylene-butylene copolymers, polystyrenebutadienes, polyethylenebutadienes, styrene-propylene-diene terpolymers, ethylene-propylene-diene terpolymers (EPDM, e.g., ethylene-propylene-dicyclopentadiene termpolymers), butyl rubbers (polyisopreneisobutylene), styrene-isoprene-butadiene terpolymers, copolymers of conjugated diene with styrene, acrylonitrile, and/or methyl methacrylate, fluorinated polymers thereof (e.g., fluorinated EP and fluorinated EPDM), and blends of one or more thereof. The crosslinkable base polymer can be solid at ambient temperature. Suitable crosslinkable base polymers may have a highly linear structure (e.g., high cis BR produced by Nd catalyst systems), a highly branched structure (e.g., high cis BR produced by Co catalyst systems), or a structure with an intermediate degree of branching (e.g., high cis BR produced by Ni catalyst systems). Suitable polydiene homopolymers or copolymers like BR may have high 1,4-cis content (e.g., 60% or greater, 80% or greater, 90% or greater, 95% or greater, or about 99% or greater, like high cis BR produced by Nd, Co, or Ni catalyst systems), high 1,4-trans content (e.g., 45% or greater, or 55% or greater, or 65% or greater, or 75% or greater, or 80% or greater, or 90% or greater, like high trans BR produced by La, Nd, or Ni catalyst systems), and/or low 1,2-vinyl content (e.g., 15% or less, or 10% or less, or 7% or less, or 5% or less, or 1% or less). Polydienes like BR can have various combinations of cis-, trans-, and vinyl isomer structures, such as having a cis-structure content greater than trans-structure content and/or 1,2-vinyl structure content, with the sum of cis-, trans-, and vinyl isomer contents in any one given polydiene being 100%. Different polydienes may be utilized alone or in blends of two or more thereof to formulate different compositions in forming golf ball components (portions or layers within or in between the core and the cover) of any desirable physical and chemical properties and performance characteristics.

Blends of polymers used as the base polymer include, without limitation, those disclosed in co-owned U.S. Pat. No. 6,774,187, the entire disclosure of which is incorporated herein by reference, as well as blends of two or more polymers chosen from cis-1,4-polyisoprene rubbers, 3,4-polyisoprene rubbers, styrene-isoprene-butadiene rubbers, emulsion polymerization prepared styrene-butadiene rubbers, solution polymerization prepared styrene-butadiene rubbers, cis-1,4-polybutadiene rubbers, and emulsion polymerization prepared butadiene-acrylonitrile or styrene-butadiene-acrylonitrile rubbers. The emulsion polymerization prepared styrene-butadiene rubber, which may enhance processability of the uncured composition mixture, may have a styrene content of 5% to 18%, or 20% to 28%, or 30% to 50%. The emulsion polymerization prepared butadiene-acrylonitrile or styrene-butadiene-acrylonitrile rubbers may have an acrylonitrile content of 2% to 40% and 2% to 30%, respectively. The solution polymerization prepared styrene-butadiene rubber, which may lower hysteresis of the composition, may have a styrene content of 5% to 50%, or 9% to 36%. The cis 1,4-polybutadiene rubber, which may enhance resiliency and wear of the composition, may have a cis-1,4 content of at least 90%.

Other parameters used in determining suitable base polymers include Mooney viscosity, solution viscosity, weight and/or number average molecular weights, and polydispersity, among others. In one example, the base polymer or polymer blend may comprise one or more polymers having a Mooney viscosity of 35 or greater, or 50 or greater, or a mid-range Mooney viscosity of 40 to 60, or a high Mooney viscosity of 65 or greater. The base polymer or polymer blend may have one or more polymers having a weight average molecular weight of 200,000 or greater, or 250,000 or greater, or 300,000 or greater, or 400,000 or greater. The base polymer or polymer blend may have one or more polymers having a polydispersity of 2 or less, or 1.8 or less, or 1.5 or less, or 1.35 or less, or 1.2 or less.

In an alternative example, when one or more of the additives disclosed herein is/are used in the composition, the base polymer or polymer blend may comprise one, two, or more polymers having a Mooney viscosity of less than 60, or 50 or less, or 35 or less, or 30 or less, or 25 or less, or 20 or less, or 15 or less. The polymer(s) may have a weight average molecular weight of 250,000 or less, or 200,000 or less, or 180,000 or less, or 150,000 or less, or 100,000 or less, or 85,000 or less, or 50,000 or less. The polymer(s) may have a polydispersity of greater than 3.5, or 4 or greater, or 4.5 or greater, or 5 or greater, preferably 10 or less, or 8 or less. The polymer(s) may have a vinyl content of 8% or greater, or 10% or greater, or 12% or greater, or 15% or greater, or 18% or greater, or 20% or greater, preferably less than 40%, or 35% or less, or 30% or less. For instance, the base polymer or polymer blend may comprise one or more polydienes synthesized using an alkyllithium or anionic catalyst system (with or without polar modifiers such as nitrogen- or oxygen-containing compounds), optionally modified by coupling agents and/or reactive compounds with functional groups.

The base polymer blend may further comprise one or more other elastomers that are crosslinkable or non-crosslinkable, such as diene rubbers and saturated rubbers known in the art. Suitable elastomers for use in the base polymer blend include, without limitation, those disclosed herein above, partially and/or fully hydrogenated versions thereof, as well as polyurethane rubbers, polyurea rubbers, metallocene-catalyzed polymers, plastomers, and multi-olefin polymers, which may be homopolymers, copolymers, or terpolymers. With a major portion (e.g., 50% or greater by weight of the base polymer blend, or 80% or greater) of the base polymer blend being one or a combination of two or more crosslinkable polymers, such as polydienes, preferably polybutadienes, these other miscible elastomers can be present in amounts of less than 50%, or 40% or less, or 30% or less, or 25% or less, or 20% or less, or 15% or less, or 10% or less, or 5% or less. In one example, the base polymer blend comprises less than 20% balata, or 18% or less, or 10% or less. In another example, the base polymer is substantially free of balata (i.e., 2% or less).

A preferred base rubber is 1,4-polybutadiene having a cis-structure of at least 40%, more preferably at least about 90%, and most preferably at least about 95%. Most preferably, the base rubber comprises high-Mooney-viscosity rubber. Preferably, the base rubber has a Mooney viscosity greater than about 35, more preferably greater than about 40, most preferably greater than about 50. Preferably, the polybutadiene rubber has a molecular weight greater than about 200,000, more preferably 275,000 or greater, most preferably 400,000 or greater, and a polydispersity of no greater than about 3, more preferably 2 or less. Examples of desirable polybutadiene rubbers include BUNA® CB22 and BUNA® CB23, commercially available from Bayer of Akron, Ohio, UBEPOL® 360L and UBEPOL® 150L, commercially available from UBE Industries of Tokyo, Japan, and CARIFLEX® BCP820 and CARIFLEX® BCP824, commercially available from Shell of Houston, Tex. If desired, the polybutadiene can also be mixed with other elastomers known in the art such as natural rubber, polyisoprene rubber and/or styrene-butadiene rubber in order to modify the properties of the core.

Crosslink initiators include any chemical and/or physical means known or available to one skilled in the art, particularly those that are capable of generating reactive free radicals, like thermal initiators and photoinitiators. Such initiators include, but are not limited to, compounds such as elemental sulfur or sulfur donors (with or without accelerators), organic peroxides, organometallic peroxides, carbon-carbon initiators, azo compounds (e.g., azobisisobutylonitrile), peresters, organic polyoxides, ozone, dioxygen, Haloid molecules, polyatomic peroxides, substituted hydrazines, hydrazides, benzophenones, alkoxyamines, nitro compounds, nitrates, nitrites, disulfides, polysulfides and organometallic compounds, as well as radiation means (with or without one or more sensitizers, like photoinitiators) such as actinic radiation, particle radiation, X-ray irradiation, electron beam irradiation, ultrasound, and heating, or a combination of two or more of such compounds and/or physical means. Initiator decomposition promoters may be used in combination with the various initiators and blend thereof. When one or more initiator compounds are used in the pure form, the amount of the total initiators may be 0.1 phr or greater, or 0.2 or greater, or 0.5 phr or greater, or 0.8 phr or greater, preferably 10 phr or less, or 5 phr or less, or 2 phr or less, or 1 phr or less. The weight ratio between any two initiator compounds, when used together, can be 0.05:1 to 50:1, or 0.1:1 to 5:1, or 0.25:1 to 3:1, or 0.5:1 to 1:1, or any other ranges there between. When the When the initiator decomposition promoters are used, the molar ratio of the promoter to the initiator may be 0.001:1 to 1:1, or 0.05:1 to 0.1:1.

The initiator can be any known polymerization initiator which decomposes during the cure cycle. Suitable initiators include organic peroxide compounds, such as peroxy ketals (e.g., 1,1-bis(t-hexylperoxy)-3,3,5-trimethylcyclohexane, 1,1-bis(t-hexylperoxy)cyclohexane, 1,1-bis(t-butylperoxy) cyclododecane, n-butyl-4,4-bis(t-butylperoxy)valerate, 2,2-bis(4,4-di-t-butylperoxycyclohexyl)propane, 1,1-di(t-butylperoxy)-3,3,5-trimethylcyclohexane, 1,1-bis(t-butylperoxy)cyclohexane, 2,2-bis(t-butylperoxy)butane, 2,2-bis(t-butylperoxy)octane), dialkyl peroxide (e.g., dicumylperoxide (DCP), α,α-bis(t-butylperoxy)diisopropylbenzene (DTBP), 2,5-dimethyl-2,5-di(t-butylperoxy)hexane, di-t-butylperoxide, di-t-amylperoxide, t-butylcumylperoxide, di(2-methyl-1-phenyl-2-propyl)peroxide, t-butyl-2-methyl-1-phenyl-2-propylperoxide, 2,5-dimethyl-2,5-di(t-butylperoxy)hexyne-3, di(2-t-butyl-peroxyisopropyl) benzeneperoxide), diacyl peroxides (e.g., isobutyryl peroxide, 2,4-dichlorobenzoyl peroxide, 3,5,5-trimethylhexanoyl peroxide, m-toluoylbenzoyl peroxide, benzoylperoxide, m-toluoylperoxide, 2,5-dimethyl-2,5-di(benzoylperoxy)hexane, acetyl peroxide, propionylperoxide, octanoylperoxide, decanoylperoxide, lauroylperoxide, stearoylperoxide, succinic acid peroxide, t-butyl-peroxymaleic acid), peroxy esters (e.g., .alpha.,.alpha.-bis(neodecanoyl peroxy)diisopropylbenzene, cumyl peroxy neodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivarate, t-butyl peroxypivarate, 1,1,3,3-tetramethylbutyl peroxy-2-ethylhexanoate, 2,5-dimethyl-2,5-bis(2-ethylhexanoyl peroxy)hexane, 1-cyclohexyl-1-methylethyl peroxy-2-ethylhexanoate, t-hexyl peroxy-2-ethylhexanoate, t-butyl peroxy-2-ethylhexanoate, t-hexyl peroxyisopropyl monocarbonate, t-butyl peroxymaleic acid, 2,5-dimethyl-2,5-bis(m-toluoyl peroxy)hexane, t-butyl peroxy-2-ethylhexyl monocarbonate, t-hexyl peroxy benzoate, 2,5-dimethyl-2,5-bis(benzoyl peroxy)hexane, t-butyl peroxy-m-toluoyl benzoate, bis(t-butyl peroxy)isophthalate, t-butyl-peroxyisopropylcarbonate, t-butylperoxyacetate, t-butylperoxyisobutyrate, t-butylperoxy-3,5,5-trimethylhexanoate, t-butylperoxylaurate, t-butylperoxybenzoate), ketone peroxides (e.g., methylcyclohexanone peroxide, methylacetoacetate peroxide, acetylacetone peroxide, methylethylketone peroxide, cyclohexanone peroxide), hydroperoxides (e.g., t-hexyl hydroperoxide, t-butylhydroperoxide, p-menthanehydroperoxide, 1,1,3,3-tetramethylbutylhydroperoxide, 2,5-dimethylhexane-2,5-dihydroperoxide, cumenehydroperoxide, diisopropylbenzenehydroperoxide), peroxydicarbonates (e.g., di-n-propyl peroxydicarbonate, diisopropyl peroxydicarbonate, bis(4-t-butylcyclohexyl) peroxydicarbonate, di-2-ethoxyethyl peroxydicarbonate, di-2-ethylhexyl peroxydicarbonate, di-2-methoxybutyl peroxydicarbonate, di(3-methyl-3-methoxybutyl) peroxydicarbonate), t-butyltrimethylsilyl proxide, 3,3',4,4'-tetra(t-butyl peroxycarbonyl)benzophenone, and mixtures of two or more thereof. DCP is the most commonly used peroxide in golf ball manufacturing. DTBP can provide higher crosslinking efficiency, low odor and longer scorch time, among some properties. DCP can be blended with DTBP for use in golf balls. Other examples include, but are not limited to, VAROX® 231 XL and Varox® DCP-R, commercially available from Elf Atochem of Philadelphia, Pa., PERKODOX® BC and PERKODOX® 14, commercially available from Akzo Nobel of Chicago, Ill., and ELASTOCHEM® DCP-70, commercially available from Rhein Chemie of Trenton, N.J.

It is well known that peroxides are available in a variety of forms having different activity. The activity is typically defined by the "active oxygen content." For example, PERKODOX® BC peroxide is 98% active and has an active oxygen content of 5.80%, whereas PERKODOX® DCP-70 is 70% active and has an active oxygen content of 4.18%. If the peroxide is present in pure form, it is preferably present in an amount of at least about 0.25 phr, more preferably between about 0.35 phr and about 2.5 phr, and most preferably between about 0.5 phr and about 2 phr. Peroxides are also available in concentrate form, which are well-known to have differing activities, as described above. In this case, if concentrate peroxides are employed in the present invention, one skilled in the art would know that the concentrations suitable for pure peroxides are easily adjusted for concentrate peroxides by dividing by the activity. For example, 2 phr of a pure peroxide is equivalent to 4 phr of a concentrate peroxide that is 50% active (i.e., 2 divided by 0.5=4).

Carbon-carbon initiators include those described in co-pending and co-owned U.S. Application Publication No. 2005-0009992, the disclosure of which is incorporated herein by reference in its entirety. Carbon-carbon initiators may be used in place of the peroxide initiators, or in blends with the peroxide initiators, the weight ratio between which is described above.

Initiator decomposition promoters may be used in combination with one or more of the additives described herein (e.g., boron-containing compounds). Useful promoters include, without limitation, iron (III) compounds (e.g., iron chloride, iron acetylacetonate, iron naphthenate, iron citrate), copper (II) compounds (e.g., copper chloride, copper citrate, copper acetylacetonate, copper stearate), molybdenum compounds (e.g., molybdenum (VI) oxide, molybdenum oxide acetylacetonate, and those disclosed herein), manganese compounds (e.g., manganese (IV) oxide, manganese naphthenate, and those disclosed herein), cobalt compounds (e.g., cobalt naphthenate, cobalt (III) acetylacetonate), tungsten compounds (e.g., tungsten (VI) oxide, sodium tungstate, silicotungstic acid, and those disclosed herein), tin compounds (e.g., dibutyltin (IV) oxide, and those disclosed herein), and metal alkoxides (e.g., titanium tetrabutoxide, aluminum tributoxide, and those disclosed herein).

Functional additives may serve a single function, or two, three, or more functions, including, without limitation, peptizer, plasticizer (e.g., physical, crosslinking), isomerization agent, crosslink co-agent, free radical mediator (e.g., sulfur donor), photoinitiator, oxidizer, sensitizer, synergizer, flame-retardant, impact modifier, thermal stabilizer, antistatic agent, compatibilizing agent, foaming agent, reinforcing agent, initiator decomposition promoter, viscosity imparting agent, polymerization adjusting agent, surface treating agent, coloring agent, perfume, processing aid, coupling agent, accelerator, activator, antidegradant, antioxidant, dilatant agent, dispersant, enhancer (e.g., for CoR), reducer (e.g., for compression, crystallinity), extender, filler (e.g., for density, modulus), inhibitor, lubricant, retarder (e.g., cure, scorch), scavenger (e.g., for oxygen, moisture, free radical), stabilizer (e.g., thermal, light, degradation), thixotropic agent, and/or wetting agent. Preferably, the additives may be a CoR enhancer (i.e., capable of increasing CoR of the core and/or the ball), isomerization mediator (e.g., capable of changing the percentages of cis, trans, and/or vinyl contents in the base polymer), crystallinity reducer (i.e., capable of decreasing the degree of crystallinity in the formed golf ball core or layer), $T_g$ shifter (i.e., capable of shifting glass transition temperature ($T_g$) curve (determined by a differential scanning calorimeter or a dynamic mechanical analyzer) of the polymer material up or down the temperature scale), modulator for degree of crosslink (i.e., capable of changing the degree of one or more types of crosslink: polymer-polymer crosslink, coagent-polymer crosslink, coagent-coagent crosslink, carbon-carbon crosslink, ionic crosslink), and/or crosslink profile modulator (i.e., capable of changing the ratio of different crosslink types). The additive may exert one or more of such functions (e.g., being a CoR enhancer) without one or more of the other functions (e.g., without being a isomerization mediator). Additives may provide different functions at the same time, or at different stages during material process, ball manufacturing, storage, and/or usage.

One group of suitable additives have the structure

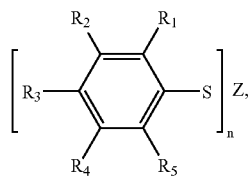

where at least one (e.g., 2, 3, 4, or 5) of $R_1$, $R_2$, $R_3$, $R_4$, and $R_5$ are the same or different electron-withdrawing groups ("EWG"); the remainder of $R_1$ to $R_5$, if any, are the same or different organic radicals, or hydrogen; Z is chosen from metal cations (monovalent, divalent, or other polyvalent, e.g., Li, Na, K, Cs, Be, Mg, Ca, Sr, Ba, Ti, Zr, Cr, Mo, Fe, Co, Rh, Ni, Pd, Pt, Cu, Ag, Zn, Cd), organometallic cations (such as those disclosed herein), and non-metal organic cations (e.g., ammonium, substituted ammonium, trityl, and any of those disclosed herein), or may also be H or halogen when n is 1 (e.g., arylsulfenyl halides); and n is an integer of 1, 2, or greater, preferably 6 or less.

In one example, the EWG is preferred EWG ("PEWG") chosen from $C_{1-12}$ perhaloalkyls (including linear and branched ones, having 1, 2, 3, 4, 5, 6, or more carbon atoms and 1, 2, 3, or more types of halogens, e.g., linear $C_{2-8}$ perhaloalkyls, branched $C_{3-6}$ perhaloalkyls), $C_{6-20}$ (per)haloaryls (including those having aromatic rings of 6 or more carbon atoms and 1, 2, 3, or more types of halogen substituents), $C_{7-20}$ (per)haloaralkyls (including those having 1, 2, 3, or more types of halogen substituents), $C_{7-20}$ (per)haloalkaryls (including those having 1, 2, 3, or more types of halogen substituents), $C_{3-20}$ (per)halocycloalkyls (including those having cyclic structures of 3 or more carbon atoms and 1, 2, 3, or more types of halogen substituents), and combinations of two or more thereof. EWG other than perhaloalkyls can be free of halogen substitution, partially halogenated, or perhalogenated. Halogens include F, Cl, Br, and I. Non-limiting examples of such EWG include —$CF_3$, —$CCl_3$, —$CBr_3$, —$CI_3$, $C_{2-8}$ (per)fluoroalkyls, $C_{2-8}$ (per)chloroalkyls, $C_{2-8}$ (per)bromoalkyls, $C_{2-8}$ (per)iodoalkyls, —$C(CF_3)_3$, —$C(CCl_3)_3$, —$C(CBr_3)_3$, —$C(CI_3)_3$, (per)fluorocycloalkyls, (per)chlorocycloalkyls, (per)bromocycloalkyls, (per)iodoocycloalkyls, (per)halophenyls (e.g., p-bromophenyl, m-bromophenyl, p-chlorophenyl), —$C(X_1)_2 X_2$, —$CX_1X_2H$, and —$CX_1X_2X_3$, where $X_1$, $X_2$, and $X_3$ are different halogens. Preferably, one or more (e.g., two or three) of $R_1$, $R_3$ and $R_5$ is/are the same or different species of EWG described above. It is believed that these preferred EWG are more electron-withdrawing than other EWG described herein below, thus are more effective in carrying out their desired functions.

Other non-limiting EWG for $R_1$ to $R_5$ include X (halogens), aldehyde, [(per)halo]alkyl/aryl carbonyl (COR, e.g., acetyl, trifluoroacetyl, phenylcarbonyl), COOZ (carboxylic acid or salt thereof), COOR ([(per)halo]ester, [(per)halo]alkylaryl oxycarbonyl, e.g., methoxycarbonyl, ethoxycarbonyl), COX (halocarbonyl), SR such as (per)halo(cyclo)alkylthio having 1, 2, 3 or more carbon atoms (e.g., trifluoromethylthio) and (per)haloarylthio having 6 or more carbon atoms, $SO_2NH_2$ (sulfonamide), $SO_2NHR$ ([(per)halo]sulfonamide), $SO_2NR_2$ ([(per)halo]sulfamoyl), SCOR ([(per)halo]carbonylthio, e.g., acetylthio), [(per)halo]amido (e.g., amido, methylamido, phenylamido, ureido), $SCONH_2$ (carbamoylthio), SOR ([(per)halo]alkyl/aryl oxythio, e.g., methoxylthio), $SO_2R$ ([(per)halo]alkyl/aryl sulfonyl, e.g., methylsulfonyl, phenylsulfonyl), CN (nitrile or cyano), $SO_3Z$ (sulfonic acid or salt thereof), $SO_3R$ ([(per)halo]sulfonate ester), $N^{\oplus}H_3$, $N^{\oplus}R_3$, $NO_2$ (nitro), and NCS (thiocyanato), where R is the same or different, optionally substituted (e.g., (per)halogenated), $C_{1-20}$ monovalent radicals, such as $C_{1-18}$ alkyls (including linear or branched ones), $C_{3-8}$ cycloalkyls, $C_{6-15}$ aryls, and $C_{7-20}$ aralkyls.

Suitable radicals for the remainder of $R_1$ to $R_5$ further include H, linear, branched, or cyclic monovalent radicals having one or more carbon atoms, alkyls (e.g., methyl, ethyl, n-propyl, i-propyl, n-butyl, s-butyl, n-pentyl, n-hexyl), aryls (e.g., phenyl, α-naphthyl, β-naphthyl), alkaryls (e.g., p-methylphenyl), aralkyls (e.g., benzyl, phenethyl), alkenyls (e.g. vinyl), aralkenyls (e.g., 2-phenylvinyl), alkynyls (e.g., ethynyl, propargyl, 2-butynyl), aralkynyls (e.g., phenethynyl), EWG-substituted aryls, [(per)halo]alkenyls (e.g., —CH═$CR_2$, —CX═$CR_2$), [(per)halo]alkynyls (C≡CR), SH (thio), OH (hydroxyl), OR such as [(per)halo]alkoxy (e.g., trifluoromethoxy, methoxy, ethoxy, propoxy, butoxy, pentyloxy, hexyloxy, isopropoxy, isobutoxy, isopentyloxy), $C_{3-8}$ [(per)halo]cycloalkyloxy (e.g., cyclopropyloxy, cyclohexyloxy, cyclohexylmethoxy), $C_{6-15}$ [(per)halo]aryloxy (e.g., phenyloxy, p-tolyloxy), $C_{7-20}$ [(per)halo]aralkyloxy (e.g., benzyloxy, phenethyloxy, diphenylmethoxy, triphenylmethoxy), $C_{7-10}$ [(per)halo]phenylalkyloxy, $C_{7-10}$ [(per)halo]alkylphenyloxy, $C_{2-7}$ [(per)halo]acyloxy (e.g., acetyloxy, propionyloxy, acryloyloxy, benzoyloxy), $C_{2-6}$ [(per)halo]alkenyloxy (e.g., vinyloxy, 1-propenyloxy, allyloxy), $C_{2-6}$ [(per)halo]alkynyloxy (e.g., ethynyloxy, 2-propinyloxy), $C_{2-7}$ [(per)halo]alkoxycarbonyloxy (e.g., methoxycarbonyloxy, ethoxycarbonyloxy), $C_{7-15}$ [(per)halo]aryloxycarbonyloxy (e.g., phenoxycarbonyloxy, benzyloxycarbonyloxy), $C_{1-7}$ [(per)halo]alkanesulfonyloxy (e.g., methanesulfonyloxy, ethanesulfonyloxy), and $C_{6-10}$ [(per)halo]arylsulfonyloxy (e.g., benzenesulfonyloxy), and hydroxyalkyls (e.g., hydroxymethyl). Any of the organic radicals described herein may be partially or fully halogenated with one or more types of halogens.

Non-limiting examples of the group of additives having the preferred EWG, as described above, include 2-, 3-, or 4-(trifluoromethyl)thiophenol, 2-, 3-, or 4-(trichloromethyl)thiophenol, 2-, 3-, or 4-(tribromomethyl)thiophenol, 2-, 3-, or 4-(triiodomethyl)thiophenol, 2,3-, 2,4-, 2,5-, 2,6-, 3,4-, or 3,5-bis(trifluoromethyl)thiophenol, 2,3-, 2,4-, 2,5-, 2,6-, 3,4-, or 3,5-bis(trichloromethyl)thiophenol, 2,3-, 2,4-, 2,5-, 2,6-, 3,4-, or 3,5-bis(tribromomethyl)thiophenol, 2,3-, 2,4-, 2,5-, 2,6-, 3,4-, or 3,5-bis(triiodomethyl)thiophenol, 2,3,4-, 2,3,5-, 2,3,6-, 2,4,5-, 2,4,6- or 3,4,5-tris(trifluoromethyl)thiophenol, 2,3,4-, 2,3,5-, 2,3,6-, 2,4,5-, 2,4,6- or 3,4,5-tris(trichloromethyl)thiophenol, 2,3,4-, 2,3,5-, 2,3,6-, 2,4,5-, 2,4,6- or 3,4,5-tris(tribromomethyl)thiophenol, 2,3,4-, 2,3,5-, 2,3,6-, 2,4,5-, 2,4,6- or 3,4,5-tris(triiodomethyl)thiophenol, and metal salts (e.g., Zn, Co, Mg) thereof.

Another group of additives are halogenated organosulfur compounds having the following general formula:

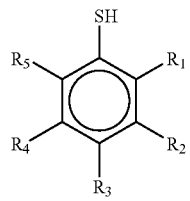

where at least one of $R_1$-$R_5$ is a halogen and where $R_1$-$R_5$ can alternatively be $C_1$-$C_8$ alkyl groups, halogen groups, thiol groups (—SH), carboxylated groups, sulfonated groups, and hydrogen, in any order. Examples of such additives include pentafluorothiophenol, 2-fluorothiophenol, 3-fluorothiophenol, 4-fluorothiophenol, 2,3-fluorothiophenol, 2,4-fluorothiophenol, 3,4-fluorothiophenol, 3,5-fluorothiophenol 2,3,4-fluorothiophenol, 3,4,5-fluorothiophenol, 2,3,4,5-tetrafluorothiophenol, 2,3,5,6-tetrafluorothiophenol, 4-chlorotetrafluorothiophenol, pentachlorothiophenol, 2-chlorothiophenol, 3-chlorothiophenol, 4-chlorothiophenol, 2,3-chlorothiophenol, 2,4-chlorothiophenol, 3,4-chlorothiophenol, 3,5-chlorothiophenol, 2,3,4-chlorothiophenol, 3,4,5-chlorothiophenol, 2,3,4,5-tetrachlorothiophenol, 2,3,5,6-tetrachlorothiophenol, pentabromothiophenol, 2-bromothiophenol, 3-bromothiophenol, 4-bromothiophenol, 2,3-bromothiophenol, 2,4-bromothiophenol, 3,4-bromothiophenol, 3,5-bromothiophenol, 2,3,4-bromothiophenol, 3,4,5-bromothiophenol, 2,3,4,5-tetrabromothiophenol, 2,3,5,6-tetrabromothiophenol, pentaiodothiophenol, 2-iodothiophenol, 3-iodothiophenol, 4-iodothiophenol, 2,3-iodothiophenol, 2,4-iodothiophenol, 3,4-iodothiophenol, 3,5-iodothiophenol, 2,3,4-iodothiophenol, 3,4,5-iodothiophenol, 2,3,4,5-tetraiodothiophenol, 2,3,5,6-tetraiodothiophenol, as well as their zinc salts, magnesium salts, and cobalt salts. In one example, the halogenated organosulfur compound is pentachlorothiophenol, which is commercially available in neat form or under the tradename STRUKTOL®, a clay-based carrier containing the sulfur compound pentachlorothiophenol loaded at 45 percent (correlating to 2.4 phr PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. In another example, the halogenated organosulfur compound is the zinc salt of pentachlorothiophenol, which is commercially available from eChinachem of San Francisco, Calif. The halogenated organosulfur compounds are preferably present in an amount greater than about 2.2 phr, more preferably between about 2.3 phr and about 5 phr, and most preferably between about 2.3 phr and about 4 phr. In an alternative example, the amount of the organosulfur compound may be less than 2.2 phr, preferably 2 phr or less, more preferably 0.1 phr to 1.5 phr, most preferably 0.5 phr to 1 phr.

Another group of additives have the general structure

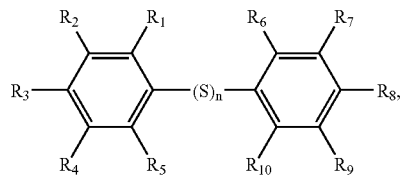

where at least one of $R_1$, $R_2$, $R_3$, $R_4$ and $R_5$, and at least one of $R_6$, $R_7$, $R_8$, $R_9$, and $R_{10}$ are the same or different radicals chosen from PEWG, —SZ, and —OZ, where PEWG and Z are described above; the remainder of $R_1$ to $R_{10}$, if any, are the same or different radicals chosen from H and other EWG and organic substituents, such as those described above; and n is an integer of 1, 2, 3, 4, or greater. In one example, at least one (e.g., two or three) of $R_1$, $R_3$ and $R_5$ and/or at least one (e.g., two or three) of $R_6$, $R_8$ and $R_{10}$ is/are the same or different PEWG. In another example, at least one (e.g., two or three) of $R_1$, $R_3$ and $R_5$ and/or at least one (e.g., two or three) of $R_6$, $R_8$ and $R_{10}$ is/are the same or different —SZ or —OZ. Non-limiting examples of such additives include 4,4'-thiobisbenzenethiol, bithionol, dichlorodiphenylsulfide, bis(4-methoxyphenyl)disulfide, bis(3-methoxyphenyl)disulfide, bis(2-methoxyphenyl)disulfide, bis(4-ethoxyphenyl)disulfide, bis(4-isopropoxyphenyl)disulfide, bis(4-cyclohexyloxyphenyl)disulfide, bis(4-allyloxyphenyl)disulfide, bis[4-(2-propinyloxy)phenyl]disulfide, bis(4-phenoxyphenyl)disulfide, bis(4-acetoxyphenyl)disulfide, bis(4-benzoyloxyphenyl)disulfide, bis(4-methanesulfonyloxyphenyl)disulfide, bis(4-benzenesulfonyloxyphenyl)disulfide, bis(4-methoxycarbonyloxyphenyl)disulfide, bis(4-phenoxycarbonyloxyphenyl)disulfide, bis(4-trifluoromethylphenyl)disulfide, bis(4-trichloromethylphenyl)disulfide, bis(4-tribromomethylphenyl)disulfide, and salts thereof, like zinc 4,4'-thiobisbenzenethiol and sodium bithionolate.

Without being bound to any particular theory, it is believed that the presence of one or more EWG on the aromatic structures, particularly at ortho and/or para positions, decreases electron densities along the S—S, S-Z, and/or C—S bonds, thereby decreasing their bond dissociation energy, making the bonds readily dissociate, particularly under the conditions of conventional cure cycle (e.g., in the presence of heat and crosslink initiator). Such bond dissociations lead to the formation of radical intermediates, which in turn may affect the long chains of the base polymer. In particular, the radical intermediates may affect the formation of one or more types of crosslink during cure, thereby enhancing resiliency of the resulting molded product, with or without concomitant impact on its other properties (e.g., compression, hardness, flexural modulus). It is further believed that the radical intermediates (e.g., thiyl radicals) may be capable of mediating hydrogen atom transfer reaction, which can result, at least partially, in cis-trans isomerization.

Another group of additives have the general structure

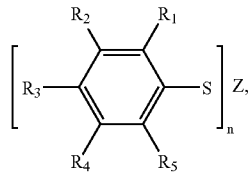

where at least one (e.g., two, three, or more) of $R_1$, $R_2$, $R_4$, and $R_5$ is —OZ or, preferably, —SZ, Z being described above; the remainder of substitutents $R_1$ to $R_5$, if any, are the same or different radicals chosen from H, EWG, and organic substituents such as those described above; n is 1 when Z is H or halogen, or an integer of 1 to 6 when Z is a cation. In one example, at least one of $R_1$ and $R_5$ is —SZ. In another example, $R_3$ is also —SZ. Alternatively, $R_3$ is an organic group other than —SZ. Non-limiting examples of such additives include ortho-dithiols and ortho-polythiols, such as 1,2-dithiolbenzene, 3,4-dithioltoluene, 3,4,5,6-tetrachloro-1,2-dithiolbenzene, 1,2,4,5-tetrathiolbenzene, 1,2-benzenedithiol zinc salt, 3,4-toluenedithiol zinc salt, 3,4,5,6-tetrachloro-1,2-benzenedithiol zinc salt, 1,2,4,5-benzenetetrathiol dizinc salt, 4,4'-thiobisbenzenethiol dizinc salt, 2,2'-thiobis(4,6-dichlorophenol) disodium salt.

Other suitable additives that are organosulfur compounds include organic sulfides, and their metal salts, as well as metal salts of aromatic ortho-thiols. Suitable organosulfur compounds include: 1,3-dithiolane,2,4,5-trithione, and its oligomer; 1,3,4,6-tetrathiapentalene-2,5-dione; 2-thiobarbituric acid; 2-thiouracil; 2,2'-dithiobis(pyridine-N-oxide); 2,2'-thiobis(4,6-dichlorophenol) disodium salt; 2,2'-(2,5-thiophenediyl)bis[5-tert-butylbenzoxazole]; 3-mercaptopropionic acid zinc salt; 3-(phenylthio)acrylic acid; 3,5-dichlorobenzenesulfonyl chloride; 4-thiouracil; 4,4'-bis(diphenylsulfonium)diphenylsulfide hexafluoroantimony salt; 4,4'-thiobisbenzenethiol dizinc salt; 6-amino-1,3,5-triazine-2,4-dithiol; 8,8'-quinolyl disulfide; acryloxythiol; acryloxythiol zinc salt; ammonium pyrrolidinecarbodithioate; benzene-1,2-dicarbodithioic acid; benzene-1,2-dicarbothioic acid; benzenedisulfonyl chloride; benzenesulfinic acid sodium salt; benzenesulfonamide; benzenesulfonic acid; benzoyldisulfide; benzo[c]thiophene-1,3-dione; benzo[c]thiophene-1,3-dithione; benzyl N,N-dimethyldithiocarbamate; bis(3-triethoxysilylpropyl)tetrasulfide; bis(4-acryloxybenzene)disulfide; bis(phenylsulfonyl)methane; butadiene sulfone; di-p-toluenesulfonamide; di-p-tolyldisulfone; di-p-tolyldisulfoxide; di-p-tolylsulfinyl sulfone; Di-(4-acryloxyphenyl)disulfide; diisopropylxanthogen disulfide; dimethyl sulfite; diphenyl-(4-phenylsulfanyl-phenyl)-sulfonium hexafluoro antimonate (V); diphenyl disulfone; diphenyldichlorosulfide; diphenylsulfone; diphenylsulfoxide; formamidine disulfide dihydrochloride; glyoxal sodium bisulfite addition compound, hydrate; manganese ethylenebis(dithiocarbamate); methanesulfonamide; N-chloro-p-toluenesulfonamide, sodium salt; N-(cyclohexylthio)phthalimide; N-(phenylthio)phthalimide; N,N'-sulfonylbisaniline; p-toluenesulfinic acid sodium salt; p-toluenesulfonamide; p-toluenesulfonyl hydrazide; pentafluorobenzenesulfenyl chloride; phenothiazine; phenoxathiin; phenylsulfonylhydride; polysulfide rubber; poly(p-phenylene ether-sulfone); poly(phenylene sulfide); s-trithiane; sulfanilamide; sulfanilic acid; sulfolane; sulfothioquinoline; tetraalkylthiuramdisulfides; tetraamylthiuramdisulfide; tetrachloropyridinethiol; tetrathiafulvalene; thianthrene; thiobis(triphenyl sulfonium hexafluorophosphate); thionin acetate; thionin perchlorate; thionine chloride; thiophthalic acid; thiophthalic anhydride; thiosemicarbazide; thiourea; thioxanthen-9-one; toluene-3,4-dithiol zinc salt; triphenylsulfonium tetrafluoroborate; triphenylsulfur chloride; zinc 2-mercaptopyridine-N-oxide; zinc 2-mercaptotoluimidazole; zinc benzenesulfinate dihydrate; zinc Di-n-butyldithiocarbamate; zinc dimethyldithiocarbamate; zinc di(acrylthioic acid); zinc isopropyl xanthate; zinc p-toluenesulfonate, and (4-phenylthiophenyl)diphenylsulfonium triflate.

Suitable metal salts of aromatic ortho-thiols include those having the general structure

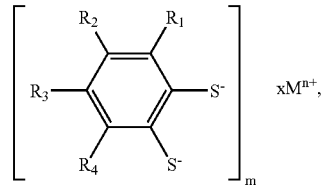

where n is an integer from 1 to 2, 4 or 6, m is an integer from 1 to 3, and x is an integer from 1 to 6, and where substitutents $R_1$ to $R_4$ are the same or different radicals chosen from H, S and EWG such as those described above. Specific non-limiting examples include 1,2-benzenedithiol zinc salt; 3,4-toluenedithiol zinc salt; 3,4,5,6-tetrachloro-1,2-benzenedithiol zinc salt, and 1,2,4,5-benzenetetrathiol dizinc salt.

Another group of suitable additives include inorganic-sulfur compounds (i.e., sulfur-containing compounds that are free of sulfur-to-carbon (i.e. organosulfur) covalent bonds, but have covalent and/or ionic bonds between sulfur and non-carbon atoms like O, N, P, Si, metals, and the like), preferably carbon-containing inorganic-sulfur compounds, and more preferably carbon-containing inorganic-sulfides), non-metal inorganic-sulfur compounds (preferably non-metal inorganic-sulfides), inorganic-thiols, metal sulfides, and derivatives thereof. Non-limiting examples of carbon-containing inorganic-sulfur compounds include ammonium diethyldithiophosphate; dithiophosphate diethyl ester; piperidine tetrathiotungstate, and glycol sulfite. Non-limiting examples of carbon-containing inorganic-sulfides include zinc di-n-butyldithiophosphate; bis(triphenyltin)sulfide; bis(diphenylphosphine) disulfide; diphenyltin sulfide; triphenylantimony sulfide; triphenylphosphine sulfide; 2,4-bis(4-methoxyphenyl)-1,3-dithia-2,4-diphosphetane-2,4-disulfide (Lawesson's Reagent), and dithiobispentamethylcyclotrisiloxane. Non-limiting examples of suitable non-metal inorganic-sulfides include nitrogen sulfide; phosphorous pentasulfide; phosphorous trisulfide; iodosulfide; iododisulfide; polythiazyl, or tetrathionic acid. Non-limiting examples of inorganic-thiols include dithiophosphate diethyl ester; tetrathiotungstic acid; thiostannic acid; sodium hydrosulfide.

Non-limiting examples of metal sulfides include sodium polysulfide; barium sulfide; antimony (V) sulfide, and ammonium tetrathiomolybdate. Non-limiting examples of non-metal inorganic-sulfur compounds include sulfamide; sulfonyldihydrazine; sulfur iodide, and ammonium thiosulfate.

Another group of suitable additives are halogenated hydrocarbons, such as halogenated alkanes, or halogenated alkenes, or halogenated alkynes, or aromatic-containing halogenated alkanes, including aromatic-containing halogenated alkanes with EWG on the aromatic ring. A non-limiting example of a suitable halogenated alkane is 1-bromooctadecane. Non-limiting examples of aromatic-containing halogenated alkanes include ortho, meta, or para-xylylene dibromide, or chlorotriphenylmethane.

Another group of suitable additives are inorganic-halides (i.e., halogen-containing compounds having at least one covalent and/or ionic bond between a halogen atom and a non-carbon atom like O, N, P, Si, and metals, but may or may not have halogen-to-carbon covalent bonds), and include carbon-containing inorganic-halides. Non-limiting examples of inorganic-halides include zinc chloride; zinc iodide; ammonium iodide; iodosulfide; iododisulfide; ruthenium (III) chloride hydrate; selenium dichloride; selenium oxychloride; sulfur iodide; tellurium dichloride; titanium (IV) chloride; vanadium (III) chloride; diphosphorus tetraiodide, and hexachlorocyclotriphosphazene. Non-limiting examples of carbon-containing inorganic-halides include bicyclo[2.2.1]hepta-2,5-diene-rhodium(I) chloride dimmer; bis(cyclopentadienyl)zirconium chloride; bis(cyclopentadienyl)zirconium chloride hydride; cyclopentadienyl titanium (IV) trichloride; diphenyl iodonium iodide; diphenyl selenium dichloride; diphenyldichlorosulfide; diphenyltin dichloride; N-bromosuccinimide; p-xylylenebis(triphenylphosphoniumbromide); pentafluorobenzenesulfenyl chloride; phenylselenyl bromide; polymer-bound selenium bromide; tellurium dichloride complex with thiourea (1:2); tetraethylammonium bromide; triphenylselenium chloride; triphenylsulfur chloride; 1,2-phenylene phosphorochloridite; 3,5-dichlorobenzenesulfonyl chloride; dicyclopentadienyltitanium dichloride; trimethylphenylammonium iodide; tosyl chloride; trichloroisocyanuric acid; benzenedisulfonyl chloride; trichloromelamine; chlorotrimethylsilane, and diphenyl phosphine chloride.

Another group of suitable additives are aromatic ethers (i.e., compounds having at least one ether linkage with at least one end linked to an aromatic structure, preferably the aromatic structure is substituted with one or more EWG as described herein above, more preferably the EWG is halogen and/or halogenated structures like PEWG), and include compounds having the general structure

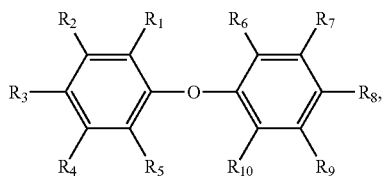

where $R_1$, $R_2$, $R_3$, $R_4$, $R_5$, $R_6$, $R_7$, $R_8$, $R_9$, and $R_{10}$ are the same or different radicals chosen from H, EWG, —SZ, and —OZ, such as those described above. In one example, at least one (e.g., two or three) of $R_1$, $R_3$ and $R_5$ and/or at least one (e.g., two or three) of $R_6$, $R_8$ and $R_{10}$ is/are the same or different EWG as disclosed herein above. In another example, the additive is a halogenated aromatic ether. A non-limiting example of aromatic ethers is 1,3-diphenoxybenzene. Non-limiting examples of halogenated aromatic ethers include 4-bromophenyl ether; pentabromophenyl ether; pentachlorophenyl ether, or pentafluorophenyl ether.

Another group of suitable additives are acids and derivatives thereof. These include stannic acids, aliphatic sulfonic acids and their salts, halogenated aliphatic sulfonic acids and their salts, aromatic sulfonic acids and their salts, halogenated aromatic sulfonic acid and their salts, aromatic sulfinic acids and their salts, halogenated aromatic sulfinic acids and their salts, inorganic sulfates, inorganic persulfates, inorganic sulfites, inorganic bisulfites, tetrathioic acids and their salts, inorganic thiosulfates, sulfamic acids and their salts, sulfanilic acids and their salts, aromatic thiophthalates and their derivatives, thioaromatic acids, thiobarbituric acids, pyrrolidinecarbodithioic acids and their salts, iodic acid and its salts, inorganic tetrathio acids and their salts, aliphatic dithiophosphoric acids and their salts, aromatic dithiocarbamic acids and their salts, aromatic carboxylic acids and their salts, halogenated aromatic carboxylic acids, halogenated carboxylic acids and their salts, and sulfuric acid amides. Non-limiting examples of stannic acids include: metastannic acid; thiostannic acid, and chlorostannic acid. Non-limiting examples of aliphatic sulfonic acids and their salts include methane sulfonic acid, or sodium ethanesulfonate. Non-limiting examples of halogenated aliphatic sulfonic acids and their salts include trifluoromethane sulfonic acid; potassium chloromethane sulfonate, and zinc triflate. Non-limiting examples of aromatic sulfonic acids and their salts include benzenesulfonic acid; p-toluenesulfonic acid, or zinc tosylate. Non-limiting examples of suitable halogenated aromatic sulfonic acid and their salts include dichlorobenzenesulfonic acid, and ammonium fluorobenzenesulfonate. Non-limiting examples of aromatic sulfinic acids and their salts include benzenesulfinic acid; zinc benzenesulfinate, or sodium toluenesulfinate. Non-limiting examples of halogenated aromatic sulfinic acids and their salts include pentachlorobenzenesulfinic acid, and zinc trichlorotoluenesulfinate. Non-limiting examples of suitable inorganic sulfates include calcium sulfate, and ammonium sulfate. Non-limiting examples of inorganic persulfates include potassium persulfate, and ammonium persulfate. Non-limiting examples of inorganic sulfites include sodium sulfite; ammonium sulfite, or potassium metabisulfite. Non-limiting examples of inorganic bisulfites include sodium bisulfite, and zinc bisulfite. Non-limiting examples of tetrathioic acids and their salts include tetrathionic acid; sodium tetrathionate, and zinc tetrathionate. Non-limiting examples of inorganic thiosulfates include ammonium thiosulfate; barium thiosulfate, or calcium thiosulfate. Non-limiting examples of suitable sulfamic acids and their salts include sulfamic acid; ammonium sulfamate, and nickel sulfamate. Non-limiting examples of suitable sulfanilic acids and their salts include sulfanilic acid; sodium sulfanilate, and zinc sulfanilate. Non-limiting examples of aromatic thiophthalates and their derivatives include thiophthalic acid, and thiophthalic anhydride. Non-limiting examples of thio aromatic acids include (3-phenylthio) acrylic acid, and chlorophenylthio acetic acid. A non-limiting example of a thiobarbituric acid is 2-thiobarbituric acid. Non-limiting examples of pyrrolidinecarbodithioic acids and their salts include 1-pyrrolidinecarbodithioic acid, or ammonium pyrrolidinecarbodithioate. Non-limiting examples of iodic acid and its salts include iodic acid; sodium iodate, and zinc iodate. Non-limiting examples of inorganic tetrathio acids and their salts include tetrathiotungstic acid; ammonium tetrathiotungstate, or piperidine tetrathiotungstate. Non-limiting examples of suitable aliphatic dithiophosphoric acids and their salts include dimethyldithiophosphoric acid, and zinc di-n-butyldithiophosphate. Non-limiting examples of aromatic dithiophosphoric acids and their salts include diphenyldithiophosphoric acid, or zinc ditolyldithiophosphate. Non-limiting examples of aliphatic dithiocarbamic acids and their salts include dimethyl dithiocarbamate; manganese ethylenebis(dithiocarbamate); manganese zinc ethylenebis(dithiocarbamate); disodium ethylenebis(dithiocarbamate), and zinc dibutyl dithiocarbamate. A non-limiting example of an aromatic dithiocarbamic acids or its salt is zinc ethyl phenyl dithiocarbamate. Non-limiting examples of aromatic carboxylic acids and their salts include benzoic acid; trimellitic acid; 4-hydrazinobenzoic acid; phthalic acid, or zinc benzoate. Non-limiting examples of halogenated aromatic carboxylic acids and their salts include chlorobenzoic acid, and zinc pentachlorobenzoate. Non-limiting examples of halogenated carboxylic acids and their salts include trichloroacetic acid; trifluoroacetic acid, or sodium chloroacetate. A non-limiting example of a sulfuric acid amide is sulfamide.

Another group of additives suitable to enhance CoR or reduce compression are organoselenium compounds, including organic selenides (e.g., diselenides and higher polyselenides), organoselenyl halides, aromatic selenocompounds (e.g., aromatic selenides, (di)aryl selenocompounds), and their derivatives, preferably aromatic selenides, more preferably with the aromatic structure substituted with one or more EWG disclosed herein, and most preferably halogenated aromatic selenides. A non-limiting example of an organoselenium compound is benzeneselenol. A non-limiting example of an organic selenide compound is tetramethyltetraselenafulvalene. Non-limiting examples of aromatic selenides include diphenyl diselenide; phenyl selenide, and ditolyl diselenide. Non-limiting examples of halogenated aromatic selenides include pentachlorophenyl diselenide; pentafluorophenyl diselenide, and 4-bromophenyl diselenide.

Another group of suitable additives are inorganic-selenium compounds, which may or may not contain carbon atoms (i.e., Se-containing compounds having at least one covalent and/or ionic bond between a Se atom and a non-carbon atom like O, N, P, Si, metals and the like, but do not have Se—C covalent bonds). Non-limiting examples of inorganic-selenium compounds include selenium dioxide, and selenium dichloride. A non-limiting example of a carbon-containing inorganic-selenium compound is triphenylphosphine selenide.

Another group of suitable additives are organotellurium compounds, including organic tellurides (e.g., ditellurides), organotelluryl halides, and aromatic tellurocompounds (e.g., (di)aryl tellurocompounds), preferably aromatic tellurides, more preferably with the aromatic structure substituted with one or more EWG disclosed herein, and most preferably halogenated aromatic tellurides. Non-limiting examples of aromatic tellurides include diphenyl ditelluride; phenyl telluride, and ditolyl ditelluride. Non-limiting examples of halogenated aromatic tellurides include pentachlorophenyl ditelluride; pentafluorophenyl ditelluride, and 4-bromophenyl ditelluride.

Another group of suitable additives are inorganic-tellurium compounds, which may or may not contain carbon atoms (i.e., Te-containing compounds having at least one covalent and/or ionic bond between a Te atom and a non-carbon atom like O, N, P, Si, metals and the like, but do not have Te—C covalent bonds). Non-limiting examples of inorganic-tellurium compounds include tellurium dioxide, and tellurium dichloride. Non-limiting examples of carbon-containing inorganic-tellurium compound includes triphenylphosphine tellurium, and tellurium dichloride complex with thiourea.

Another group of suitable additives are organometallic coordination compounds, including unsaturated organometallic coordination compounds, and may be cyclic or acyclic. Non-limiting examples of cyclic organometallic coordination compounds include bicyclo[2.2.1]hepta-2,5-diene-rhodium(I) chloride dimer; (bicyclo[2.2.1]hepta-2,5-diene) dichlororuthenium (II) polymer; bis(cyclopentadienyl) zirconium dichloride; bis(cyclopentadienyl)zirconium chloride hydride, and cyclopentadienyl titanium (IV) trichloride. Non-limiting examples of acyclic organometallic coordination compounds include 2,6,10-dodecatriene-1, 12-diyl nickeltrifluoroacetic acid; 2,6,10-dodecatriene-1,12-diyl nickelfluoroacetate, and bis(π-allyl nickel trifluoroacetate).

Another group of suitable additives are aromatic iodonium compounds (e.g., aromatic iodonium salts), preferably aromatic iodonium halides, optionally having the aromatic structure substituted with one or more EWG described herein. Non-limiting examples of aromatic iodonium compounds include diphenyl iodonium iodide; diphenyl iodonium bromide; diphenyl chloride; diphenyl iodonium nitrate; diphenyl iodonium acetate; diphenyl iodonium perchlorate; diphenyl iodonium 9,10-dimethoxyanthracene-2-sulfonate; diphenyl iodonium hexafluorophosphate; diphenyl iodonium perfluoro-1-butanesulfonate; diphenyl iodonium p-toluenesulfonate; diphenyl iodonium triflate, and diphenyl iodonium-2-carboxylate monohydrate.

Another group of suitable additives are thiocyanate salts. Non-limiting examples of thiocyanate salts include ammonium thiocyanate, and sodium thiocyanate.

Another group of suitable additives are benzofurazans including, but not limited to benzofuroxan; benzofurazan dioxide, and benzofurazan.

Another group of suitable additives are Verkade Superbases including but not limited to trimethylphosphatrane; triisopropylphosphatrane, and triisobutylphosphatrane.

Another group of suitable additives are acylhalides. Non-limiting examples of acylchlorides include oxalylchloride; benzoyl chloride, and pentafluorobenzoyl chloride.

Other suitable additives include iodine; chlorosulfonated polyethylene rubber; poly(4-vinylpyridinium dichromate), crosslinked with 2% DVB; tetraphenyl tin; titanium isopropoxide; xanthone, and tris(triphenylphosphine)ruthenium hydrochloride.

Another group of suitable additives are amino acids and their derivatives [e.g., aliphatic amino acids, aromatic amino acids, halogenated amino acids, amides thereof (e.g., corresponding cyclic amides, if any, and addition products with hydroxyl-containing compounds), peptides thereof (e.g., with one or more other amino acids, including polypeptides), conjugates thereof (e.g., S-conjugates, Se-conjugates, Te-conjugates, disulfides, diselenides, ditellurides, selenylsulfides, tellurylsulfides, tellurylselenides), esters thereof (e.g., alkyls like methyl and ethyl, cycloalkyl, aryl), salts thereof (including those having metal cations, organometallic cations, and non-metal cations, examples of which are disclosed herein), and various isomers thereof having amine and acid groups], particularly sulfoamino acids (preferably other than cystine), selenoamino acids, and telluroamino acids.

Non-limiting examples of sulfoamino acids include cysteine, S-alk(en)ylcysteines (e.g., S-methylcysteine, S-ethylcysteine, S-propylcysteine, S-butylcysteine, S-t-butylcysteine, S-allylcysteine), γ-glutamyl-S-alk(en)ylcysteines (e.g., γ-glutamyl-S-methylcysteine, γ-glutamyl-S-propylcysteine, γ-glutamyl-S-allylcysteine), S-alk(en)ylcysteine sulfoxides (e.g., methiin, ethiin, propiin, S-butylcysteine sulfoxide, alliin, isoalliin, S-(methylthiomethyl)cysteine sulfoxide), S-arylcysteines (e.g., S-benzylcysteine, S-phenylcysteine), halogenated sulfoamino acids (e.g., S-(p-chlorobenzyl)cysteine, S-(p-bromophenyl)mercapturic acid, trifluoromethionine), petiveriin, 2-hydroxyethylcysteine, hydroxyethiin, S-allylmercaptocysteine, S-allylsulfonylalanine, N-acetyl-cysteine (mercapturic acid), penicillamine, (3,3-dimethylcysteine), S-[2-(4-pyridyl)ethyl]cysteine, S-(carboxymethyl)cysteine, S-nitrosoglutathione, S-nitroso-N-acetyl-penicillamine, S-benzylcysteine p-nitroanilide, S-[N-(3-phenylpropyl)(thiocarbamoyl)]cysteine, S-[N-benzyl(thiocarbamoyl)]cysteine, S-tritylcysteine, S-(t-butylthio)cysteine, cysteine-S-sulfate, cysteine-glutathione disulfide, cysteinesulfinic acid, N,S-(dibenzyloxycarbonyl)cysteine, S-(acetamidomethyl)cysteine, S-(p-methoxybenzyl)cysteine, S-(p-methylbenzyl)cysteine, S-(t-butylthio)cysteine, N-(2-nitrophenylsulfenyl)alanine, N-(2-nitrophenylsulfenyl)phenylalanine, methionine, methionine sulfoxide, methionine sulfone, methionine sulfoximine, methylmethionine, glycylmethionine, methionylmethionine, N-(2,4-dinitrophenyl)methionine, N-(2,4-dinitrophenyl)methionine sulfone, N-benzoylmethionine, N-(benzyloxycarbonyl)methionine, N-formylmethionine, N-phthaloylmethionine, ethionine, ethionine sulfoxide, ethionine sulfone, ethionine sulfoximine, prothionine, prothionin sulfoximine, buthionine, buthionine sulfoxide, buthionine sulfone, buthionine sulfoximine, buthionin sulfoxime, glutathione, S-hexylglutathione, S-nitrosoglutathione, diglutathione, lanthionine, penthionine, cysteinylglycine, glutamylcysteine, glutamylcysteinylglycine, S-adenosylmethionine, homocystine, homocysteine, S-(2-amino-2-carboxyethyl)homocysteine, S-adenosylhomocysteine, homocysteinethiolactone, homocysteine sulfinic acid, homocysteic acid, S-phenylhomocysteine, N-acetyl-methionine, pentachloroaniline mercapturic acid, malonocysteine, conjugate of pentachlorothiophenol (PCTP) with cysteine, conjugate of PCTP with malonocysteine, conjugate of PCTP with pyruvate, conjugate of PCTP with acetate, conjugates of PCTP with S-glycosides, conjugate of PCTP with glutamylcysteine, S-(pentachlorophenyl)cysteine, cysteic acid, cysteine sulfinic acid, cysteic acid monohydrate, methionine sulfone, methionine sulfoxide, propionine, 4-amino-2-methylthio-5-thiazolecarboxylic acid, [14C, 15N]-2-amino-6-(methylthio)caproic acid, 1-amino-3-(methylthio)propylphosphonic acid, 1-amino-3-(methylthio)propylphosphinic acid, (4-amino-2-methyl-5-pyrimidinyl methylthio)acetic acid, 4-(2'-carboxy-2'-hydroxy-ethylthio)-2-piperidinecarboxylic acid, aminomercaptobenoic acids (e.g., 3-amino-2-mercaptobenzoic acid, 4-amino-3-mercapto benzoic acid) and derivatives thereof (e.g., those disclosed in U.S. Pat. No. 5,847,147, the entirety of which is incorporated herein by refererence), 2-aminohexanoic acid, 4-amino-2-(ethylthio)-5-pyrimidinecarboxylic acid, 2-amino-5-(2-propylthio)-1-pentanoic acid, 2-amino-3-mercapto-3-methylbutanoic acid, 2-mercapto-4 methyl-5-thiazole acetic acid, α-amino-β-mercapto-β,β-pentamethylenepropionic acid, 6-amino-2-mercapto-5-methylpyrimidine-4-carboxylic acid, and their derivatives.

Non-limiting examples of selenoamino acids include selenocysteine, Se-alk(en)ylselenocysteines (e.g., Se-methylselenocysteine, Se-propylselenocysteine, Se-allylselenocysteine, Se-propenylselenocysteine, Se-2-methyl-2-propenylselenocysteine), γ-glutamyl-Se-alk(en)ylselenocysteines (e.g., γ-glutamyl-Se-methylselenocysteine, γ-glutamyl-Se-propylselenocysteine, γ-glutamyl-Se-allylselenocysteine), Se-alk(en)ylselenocysteine selenoxides (e.g., Se-proponylselenocysteine selenoxide), Se-propynylselenocysteine, Se-arylselenocysteines (e.g., Se-benzylselenocysteine, Se-phenylselenocysteine), Se-phenylselenohomocysteine, halogenated selenoamino acids (e.g., Se-(p-chlorobenzyl)selenocysteine), Se-allylselenocysteine, (Se,Se-dimethylselenocysteine), Se-(carboxymethyl)selenocysteine, selenoglutathione, selenodiglutathione, selenocysteine-cysteine selenylsulfide, selenocysteine-glutathione selenylsulfide, selenocysteine selenol, selenocysteine selenic acid, selenocysteine selenenic acid, Se-(p-methoxybenzyl)selenocysteine, Se-(p-methylbenzyl)selenocysteine, Se-n-butylselenocysteine, selenocystine, selenocystamine, sulfoselenocystine, N-tert-butoxycarbonyl-selenocystine, selenocystine-Se-methylselenocysteine, selenocystathionine, selenotrisulfides of cystine, selenocysteic acid, selenomethionine, selenomethionine selenoxide, selenomethionine selenone, Se-methylselenomethionine, Se-adenosylselenomethionine, selenoethionine, γ-glutamyl-selenoethionine, selenoglutathione, selenodiglutathione, selenolanthionine, γ-glutamyl-selenocysteinylglycine diselenide, selenohomocystine, selenohomocysteine, Se-adenosylselenohomocysteine, selenogammaaminobutyric acid, and seleninoalanine.

Non-limiting examples of telluroamino acids include tellurocysteine, tellurocystine, telluromethionine, aromatic telluroamino acids (e.g., Te-phenyltellurohomocysteine, Te-phenyltellurocysteine), and halogenated telluroamino acids.

Another group of additives are boron-containing compounds, which may be substituted or un-substituted (e.g., non-halogenated or (per)halogenated), and include, without limitation, boranes (e.g., monoorgano-, diorgano-, and triorgano-borane compounds of or containing $BR_3$), borates (including boric acids, like $B(OR)_3$, as well as sulfur-substituted borates and amine borate esters $B(OR")_3N$), boronates (including boronic acids, like $R'B(OR)_2$, as well as functional boronates $YR"B(OR)_2$ and diboronates $Y'[R"B(OR)_2]_2$), borinates (including borinic acids, like $R'_2B(OR)$), dioxaborolanes, dioxaborinanes, and metal and non-metal salts thereof (including salts containing tetraorgano-borane anions $R_4B^{\ominus}$), where R and R' are the same or different monovalent radicals chosen from H and linear, branched, and/or cyclic radicals having 40 or less (e.g., 1-20, 1-10, 1-8, 1-6, or 1-3) carbon atoms (e.g, alk(en)yl, aryl, aralk(en)yl, alk(en)aryl like alk(en)ylphenyl, cycloalk(en)yl, alk(en)ylcycloalk(en)yl, cycloalk(en)ylalk(en)yl, and combinations thereof), optionally having one or more heteroatoms (e.g, O, N, S, P, Si), optionally substituted with one or more EWG as disclosed above; R" is the same or different divalent radicals chosen from linear, branched, and/or cyclic radicals having 20 or less carbon atoms (e.g, $C_{1-15}$ or $C_{1-3}$ alk(en)ylene, $C_{6-10}$ (alkyl)arylene, $C_{6-10}$ (alkyl)cycloalk(en)ylene, and combinations thereof), optionally having one or more heteroatoms, optionally substituted with one or more EWG as disclosed above; Y is a functional group chosen from AZ as disclosed above, thiocyano (—SCN), epoxyl, glycidyl, epithio, vinyl, allyl, and amines (primary or secondary); and Y' is a divalent radical chosen from polysulfide $S_y$ or polyselenium $Se_y$, where y is an integer of 1, 2, 3, 4, and up to 8. Preferably, one or more of the carbons forming the C—O—B linkages are secondary and/or tertiary carbons so as to sterically hinder hydrolysis. Boron-containing compounds may be used with or without amine-based compounds, such as those disclosed herein.

Non-limiting examples of boranes include triphenylphosphineborane, dibutoxyvinylborane, decaborane, morpholineborane, dichlorophenylborane, dibromophenylborane, tris(2,4,6-trimethylphenyl)borane). Salts of boranes include metal salts (e.g., with cations of Na, Li, K, Mg, Zn, Co, Ca) and non-metal salts (e.g., with cations of quaternary ammonium, quaternary pyridinium, quaternary quinolinium, (organo)phosphonium, (organo)sulfonium, (organo)oxonium, (organo)iodonium, (organo)azonium, like tetrabutylammonium, tetramethylammonium, tetraethylammonium, tributylamine, triethanolarmine, methylpyridinium, ethylpyridinium, butylpyridinium, methylquinolinium, ethylquinolinium, butylquinolinium) having an anion of $R_4B^{\ominus}$. At least one R in the anion may be an aryl, aralkyl, or alkaryl group, optionally having one or more substituents (e.g., EWG as disclosed above, linear or branched $C_{1-6}$ alkyls, EWG- or non-EWG-substituted alkyls, phenyl, EWG- or non-EWG-substituted phenyl). The remaining R in the anion may be the same or different groups chosen from alk(en)yls, aryls, aralkyls, alk(en)aryls, cycloalk(en)yls, optionally having one or more substituents as disclosed above. Non-limiting examples of the anion include those having one aryl group (e.g., trialkylphenylboron, trialkyl(p-chlorophenyl)boron, trialkyl(p-fluorophenyl)boron, trialkyl (3,5-bistrifluoromethyl)phenylboron, trialkyl [3,5-bis(1,1,1,3,3,3-hexafluoro-2-methoxy-2-propyl)phenyl]boron, trialkyl(p-nitrophenyl)boron, trialkyl(m-nitrophenyl)boron, trialkyl(p-butylphenyl)boron, trialkyl(m-butylphenyl)boron, trialkyl(p-butyloxyphenyl)boron, trialkyl(m-butyloxyphenyl)boron, trialkyl(p-octyloxyphenyl)boron, trialkyl(m-octyloxyphenyl)boron), those having two aryl group (e.g., dialkyldiphenylboron, dialkyldi(p-chlorophenyl)boron, dialkyldi(p-fluorophenyl)boron, dialkyldi(3,5-bistrifluoromethyl)phenylboron, dialkyldi[3,5-bis(1,1,1,3,3,3-hexafluoro-2-methoxy-2-propyl)phenyl]boron, dialkyl(p-nitrophenyl)boron, dialkyldi(m-nitrophenyl)boron, dialkyldi(p-butylphenyl)boron, dialkyldi(m-butylphenyl)boron, dialkyldi(p-butyloxyphenyl)boron, dialkyldi(m-butyloxyphenyl)boron, dialkyldi(p-octyloxyphenyl)boron, dialkyldi(m-octyloxyphenyl)boron), those having three aryl groups (e.g., monoalkyltriphenylboron, monoalkyltris(p-chlorophenyl)boron, monoalkyltris(p-fluorophenyl)boron, monoalkyltris(3,5-bistrifluoromethyl)phenylboron, monoalkyltris[3,5-bis(1,1,1,3,3,3-hexafluoro-2-methoxy-2-propyl)phenyl]boron, monoalkyltris(p-nitrophenyl)boron, monoalkyltris(m-nitrophenyl)boron, monoalkyltris(p-butylphenyl)boron, monoalkyltris(m-butylphenyl)boron, monoalkyltris(p-butyloxyphenyl)boron, monoalkyltris(m-butyloxyphenyl)boron, monoalkyltris(p-octyloxyphenyl)boron, monoalkyltris(m-octyloxyphenyl)boron), those having four aryl groups (e.g., tetraphenylboron, tetrakis(p-chlorophenyl)boron, tetrakis(p-fluorophenyl)boron, tetrakis(3,5-bistrifluoromethyl)phenylboron, tetrakis[3,5-bis(1,1,1,3,3,3-hexafluoro-2-methoxy-2-propyl)phenyl]boron, tetrakis(p-nitrophenyl)boron, tetrakis(m-nitrophenyl)boron, tetrakis(p-butylphenyl)boron, tetrakis(m-butylphenyl)boron, tetrakis(p-butyloxyphenyl)boron, tetrakis(m-butyloxyphenyl)boron, tetrakis(p-octyloxyphenyl)boron, tetrakis(m-octyloxyphenyl)boron), where the alkyl group is linear or branched $C_{1-20}$ alkyls (e.g., n-butyl, n-octyl, n-dodecyl), and salts thereof (e.g., tetraphenylboron sodium).

Non-limiting examples of borates include alkylborates (e.g., trimethylborate, triethylborate, tris(2-chloroethyl)borate, tris(2-aminoethyl)borate, tri(n-propyl)borate, triisopropylborate, tri(n-butyl)borate, triisobutylborate, tri(sec-butyl) borate, tri(t-butyl)borate, tri(n-pentyl)borate, trihexylborate, tris(4-methyl-2-pentyl)borate, tris(2-ethylhexyl)borate, trioctylborate, tris(1-methylheptyl)borate, tris(2-ethylhexyl)borate, tris(2,6-dimethyl-4-heptyl)borate, tris(diisopropylcarbinyl)borate, bis(diisobutylcarbinyl)borate, tris(3,5-dimethyl-4-heptyl)borate, tridecylborate, tridodecylborate, trioctadecylborate, tris(2-dimethylaminoethyl)borate); cycloalkylborates (e.g., tricyclohexylborate, tri(2-cyclohexylcyclohexyl)borate, di(n-butyl)[2,6-di(t-butyl)-4-methylphenyl]borate); (alkyl)arylborates (e.g., triphenylborate, tri(o-tolyl)borate, tri(m,p-cresyl)borate, tri(o-chlorophenyl)borate, tri(nonylphenyl)borate, dihydrogen nonylphenyl borate); alkenylborates (e.g., triallylborate); cyclic esters of boric acid (e.g., glycerol borate, triethylamine glycerol borate, monoethanolamine glycerol borate, triethanolamine borate (boratran), tripropanolamine borate, triisopropanolamine borate, and those formed form alkanolamines, alkane polyols, and cycloalkane polyols, such as propane-1,3-diol, phenyl ethane-1,2-diol, ethyl-2,4-dimethylpentane-2,4-diol, and 2-ethyl-2 hydroxymethyl-1,3-propane diol); inorganic borates (e.g., sodium tetraborate, lithium tetraborate); and adducts of amines (e.g., tertiary alkyl primary amines, and those disclosed herein) with borates (e.g., boro-tetra-n-propylate, tri(n-propyl)borate, and those disclosed herein) and/or boranes (e.g., dimethylamine borane, pyridine borane, trimethylamine borane, triethylamine borane), trimethylamine-N-ethamidoborane, [bis(2-chloroethyl)amino] bis(o-hydroxyphenoxy)borane, tris[bis(2-chloroethyl)amino]borane, ethylenediamine bisborane, t-butylamine borane, hexamethylenetetramine borane, N,N-dimethylbenzylamine borane, tetrakis(dimethylamino)diborane.

Non-limiting examples of boronates and boronic acids include 4-borono-benzoic acid, 3-ethoxycarbonylphenylboronic acid, 3-isopropoxycarbonylphenylboronic acid, m-nitrophenylboronic acid, p-bromophenylboronic acid, p-chlorophenylboronic acid, m- or p-benzenediboronic acid, nonylboronic acid, o-phenylene-benzeneboronate, 2,2'-stilbenediboronic acid, p-tolylboronic acid, phenylboronic acid, 1-naphthaleneboronic acid, 1-hexaneboronic acid, 1-propaneboronic acid, 1-pentaneboronic acid, ferroceneboronic acid, (2-phenylthioethenyl)dibutylboronate, 2-mesityleneboronic acid, 2,2'-dimethoxybiphenyl-5-boronic acid, 1-naphthaleneboronic acid, 2-chloro-4-fluorophenylboronic acid, 2-chloro-4-trifluoromethylphenylboronic acid, 2-fluoro-4-iodophenylboronic acid, 2-methoxyphenylboronic acid, 2-(methylthio)phenylboronic acid, 2-naphthaleneboronic acid, 2-thiopheneboronic acid, tolylboronic acid, 3-carboxyphenylboronic acid, 3-chlorophenylboronic acid, 3-chloro-4-fluorophenylboronic acid, 3-fluorophenylboronic acid, 3-methoxyphenylboronic acid, 3-(methylthio) phenylboronic acid, 3-tolylboronic acid, 3-(trifluoromethyl) phenylboronic acid, 4-biphenylboronic acid, 4-bromophenylboronic acid, 4-bromo-2,3-difluorophenylboronic acid, 4-carboxyphenylboronic acid, 4-chlorophenylboronic acid, 4-cyanophenylboronic acid, 4-fluorophenylboronic acid, 4-fluoro-3-methylphenylboronic acid, 4-methoxyphenylboronic acid, 4-(methylthio)phenylboronic acid, 4-tolylboronic acid, 4-(trifluoromethoxy)phenylboronic acid, 5-fluoro-2-methylphenylboronic acid, 5-indolylboronic acid, 2,4-dichlorophenylboronic acid, 2,4-difluorophenylboronic acid, 2,4-dimethylphenylboronic acid, 3,4-dichlorophenylboronic acid, 3,4-difluorophenylboronic acid, 3,4-dimethylphenylboronic acid, 3,5-bis(trifluoromethyl)phenylboronic acid, 3,5-dichlorophenylboronic acid, 3,5-difluorophenylboronic acid, 3,4,5-trifluorophenylboronic acid.

Non-limiting example of heterocylic compounds having at least one boron atom as a ring member include dioxaboroles (e.g., catecholborane (1,3,2-benzodioxaborole), 2-(5,6-dichlorophenyl)-1,3,2-benzodioxaborole, 2-(5,6-dichloro-4-methylthiophenyl)-1,3,2-benzodioxaborole, 2,4,5-triphenyl-1,3,2-dioxaborole); dioxaborlanes (e.g., 2-methoxy-1,3,2-dioxaborolane, 2-isopropoxy-4,4,5,5-tetramethyl-1,3,2-dioxaborolane, 4-hydroxymethyl-1,3,2-dioxaborolan-2-ol, (2-isopropoxy-1,3,2-dioxaborolan-4-yl)methanol, [2-(4-hydroxymethyl-1,3,2-dioxaborolan-2-yloxy)-1,3,2-dioxaborolan-4-yl]methanol, bispinacolatobiborate, 2-bis(2-choroethyl)amino-1,3,2-dioxaborolane, [2-1,3,2-dioxaborolan-2-yloxy)ethyl]dimethylamine, [2-(4,4,5,5,-tetramethyl-1,3,2-dioxaborolan-2-yloxy)ethyl]dimethylamine, 2,7-di(ethylaminomethyl)-2,4,6,9-tetraoxa-5-bora-spiro[4,4]nonane, 2,7-di(t-butylaminomethyl)-2,4,6,9-tetraoxa-5-bora-spiro[4,4]nonane); dioxaborinanes (e.g., tripropyleneglycol biborate, dibutyleneglycol biborate, tributyleneglycol biborate, hexyleneglycol biborate, trihexyleneglycol biborate, 1,2-dioxaborinane, 2-butyl-1,3,2-dioxaborinane, 1,3,2-dioxaborinan-2-ol, 4-methyl-1,3,2-dioxaborinan-2-ol, 4,4,6-trimethyl-1,3,2-dioxaborinan-2-ol, 2-isopropoxy-1,3,2-dioxaborinane, 2-isopropoxy-4-methyl-1,3,2-dioxaborinane, 2-isopropoxy-4,4,6-trimethyl-1,3,2-dioxaborinane, 2-bis(2-chloroethyl)amino-1,3,2-dioxaborinane, [2-(1,3,2-dioxaborinan-2-yloxy)ethyl]dimethylamine, [2-(4-methyl-1,3,2-dioxaborinan-2-yloxy)ethyl]dimethylamine, [2-(4,4,6-trimethyl-1,3,2-dioxaborinan-2-yloxy) ethyl]dimethylamine, 2,2'-bis(5,5-dimethyl-1,3,2-dioxaborinane), 2,2'-oxybis(1,3,2-dioxaborinane), 2,2'-oxybis(4,4,6-trimethyl-1,3,2-dioxaborinane), 2,2'-(methyltrimethylenedioxy)bis(4-methyl-1,3,2-dioxaborinane), 5-methyl-5-propyl-2-(p-tolyl)-1,3,2-dioxaborinane, 2-hydroxy-4,4,6-trimethyl-1,3,2-dioxaborinane); dithiaborolanes (e.g., 2-methyl-dithiaborolane, 2-methylthio-dithiaborolane, 2-chloro-dithiaborolane); dithiaborinanes (e.g., 2-chloro-1,3,2-dithiaborinane, 2-bis(2-chloroethyl)amino-1,3,2-dithiaborinane); boroxins (e.g., boroxin, tributylboroxin, trimethoxyboroxin, triphenylboroxin, tris(cyclohexyloxy) boroxin); borazines (e.g., borazine, trimethylborazine, 2,4,6-trichloroborazine, 2,4,6-trimethyl-1,3,5-triphenylborazine).

Other boron-containing compounds include boron-containing organosulfides (e.g., B-nonyl-bis(octylphenol)sulfide), borinates (e.g., o-(2-aminoethyl)diphenylborinate), as well as metal salts and non-metal salts of boron complexes (e.g., dipentylammonium tetrafluoroborate, dibutylammonium tetrafluoroborate, sodium tetraethyoxyborate, sodium tetraisopropoxyborate, trityl tetrafluoroborate, ammonia boron fluoride, cetyltrimethylammonium borohydride, methyltrioctylammonium borohydride, tetraethylammonium borohydride, sodium borofluoride, tetrapropylammonium tetrafluoroborate, triphenylsulfonium tetrafluoroborate, diphenyliodonium tetrafluoroborate, tri(p-tolyl) sulfonium tetrafluoroborate, rubidium tetrafluoroborate, mono-N-butylammonium tetrafluoroborate, sodium tetramethoxyborate, sodium boroheptonate).

Another group of additives are Si-containing compounds, which include, without limitation, those having the structures $R_xSiR'_{4-x}$ or $S_y[(R'')_zG]_2$, where R is the same or different monovalent radicals chosen from H, halogen (e.g., F, Cl, Br, I), linear or branched $C_{1-8}$ or $C_{2-4}$ alkyl, aryl, aralkyl, and vinyl, R' is the same or different monovalent radical chosen from halogen, hydroxyl, linear or branched $C_{1-8}$ or $C_{2-4}$ oxyalkyl, $C_{5-10}$ oxycycloalkyl, oxyaryl, oxyaryalkyl, and oxyvinyl, R" is the same or different divalent radicals, preferably linear or branched $C_{1-18}$ divalent hydrocarbons, such as $C_{1-18}$ or $C_{2-4}$ alkylenes, optioinally having one or more heteroatoms (e.g., O, N, S), G is the same or different Si-contaning monovalent radicals, such as substituted or non-substituted (cyclo)(poly)(alkyl)siloxanes, or silyl groups of $—Si(R_x)(R'_{3-x})$ where R and R' are as desribed above, x is a whole number of 0, 1, 2, or 3, y is an integer of 1, 2, 3, or 4, and up to 8, and z is 0 or 1.

Non-limiting examples of oxyalkyl silanes include tetramethoxysilane, tetraethoxysilane, tetraisopropoxysilane, tetrabutoxysilane, tetraoctylsilane, methyltrimethoxysilane, methyltriethoxysilane, methyltriisopropoxysilane, ethyltrimethoxysilane, ethyltriethoxysilane, ethyltriisopropoxysilane, octyltrimethoxysilane, octyltriethoxysilane, vinyltrimethoxysilane, vinyltriethoxysilane, phenyltrimethoxysilane, phenyltriethoxysilane, trimethoxysilane, triethoxysilane, triisopropoxysilane, fluorotrimethoxysilane, fluorotriethoxysilane, dimethyldimethoxysilane, dimethyldiethoxysilane, diethyldimethoxysilane, diethyldiethoxysilane, dimethoxysilane, diethoxysilane, difluorodimethoxysilane, difluorodiethoxysilane, trifluoromethyltrimethoxysilane, and trifluoromethyltriethoxysilane.

Non-limiting examples of halogenated silanes include trichlorosilane, tribromosilane, fluorotrichlorosilane, methyltribromosilane, ethyltrichlorosilane, chlorotrimethylsilane, fluorotrimethylsilane, vinyltrichlorosilane and phenyltrichlorosilane.

Non-limiting examples of sulfur-containing silicocompounds include dithiobis(pentamethylcyclotrisiloxane), 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl) disulfide, 3,3'-bis(trimethoxysilylpropyl)hexasulfide, 3,3'-bis(trimethoxysilylpropyl)octasulfide, 3,3'-bis (trioctoxysilylpropyl)tetrasulfide, 3,3'-bis (trihexoxysilylpropyl)disulfide, 3,3'-bis(tri-2"-ethylhexoxysilylpropyl)trisulfide, 3,3'-bis (triisooctoxysilylpropyl)tetrasulfide, 3,3'-bis(tri-t-butoxysilylpropyl)disulfide, 2,2'-bis (methoxydiethoxysilylethyl)tetrasulfide, 2,2'-bis (tripropoxysilylethyl)pentasulfide, 3,3'-bis (tricyclohexoxysilylpropyl)tetrasulfide, 3,3'-bis (tricyclopentoxysilylpropyl)trisulfide, 2,2'-bis(tri-2"-methylcyclohexoxysilylethyl)tetrasulfide, bis (trimethoxysilylmethyl)tetrasulfide, 3-methoxyethoxypropoxysilylpropyl-3'-diethoxybutoxysilylpropyl-tetrasulfide, 2,2'-bis(dimethylmethoxysilylethyl) disulfide, 2,2'-bis(dimethyl-sec-butoxysilylethyl)trisulfide, 3,3'-bis(methylbutylethoxysilylpropyl)tetrasulfide, 3,3'-bis (di-t-butylmethoxysilylpropyl)tetrasulfide, 2,2'-bis(phenylmethylmethoxysilylethyl)trisulfide, 3,3'-bis(diphenylisopropoxysilylpropyl)tetrasulfide, 3,3'-bis (diphenylcyclohexoxysilylpropyl)-disulfide, 3,3'-bis (dimethyl-ethylmercapto-silylpropyl)tetrasulfide, 2,2'-bis (methyldimethoxysilyl-ethyl)trisulfide, 2,2'-bis(methylethoxypropoxysilylethyl)tetrasulfide, 3,3'-bis (diethylmethoxysilylpropyl) tetrasulfide, 3,3'-bis(ethyl-di-sec-butoxysilylpropyl)disulfide, 3,3'-bis (propyldiethoxysilylpropyl)disulfide, 3,3'-bis (butyldimethoxysilylpropyl)trisulfide, 3,3'-bis (phenyldimethoxysilylpropyl)tetrasulfide, 3-phenylethoxybutoxysilylpropyl-3'-trimethoxysilylpropyl-tetrasulfide, 4,4'-bis(trimethoxysilylbutyl)tetrasulfide, 6,6'-bis(triethoxysilylhexyl)tetrasulfide, 12,12'-bis(triisopropoxysilyldodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(methyldimethoxysilylpentyl)trisulfide, 3,3'-bis(trimethoxysilyl-2-methylpropyl)tetrasulfide, 3,3'-bis(phenyldimethoxysilyl-2-methylpropyl)disulfide.

Another group of additives are crosslinkable and/or polymerizable compounds (e.g., monomers, and oligomers and polymers formed from such monomers) having one, two, three, or more unsaturated moieties each having at least one readily extractable hydrogen in the α position to the unsaturated bonds (e.g., vinyl group, allyl group, isopropenyl group, acryloyl group, methacryloyl group, acrylamide group, methacrylamide group). Such additives may be acidic (including anhydrides thereof) or non-acidic, being sulfur-free or comprising one or more heteroatoms (e.g., O, N, S, P, Si), being aliphatic, alicyclic, or aromatic, and include mono-, di-, and poly-esters, mono-, di-, and poly-amides, mono-, di-, and poly-esteramides, bismaleimides, organic salts (e.g., the cations being (organo)ammoniums) and metallic salts (e.g., the cations being Li, Na, K, Rb, Cs, Mg, Ca, Sr, Ba, Ti, Zr, Cr, Mo, Mn, Fe, Ru, Co, Rh, Ir, Cu, Zn, Cd, Al) thereof, and liquid vinyl polydienes.

Acidic crosslinkable and/or polymerizable compounds may have one or more acidic moieties chosen from carboxyl group, sulfonico group, sulfinico group, phosphono group, phosphinico group, and acid anhydride radical, include, without limitation, acrylic acid, methacrylic acid, ethacrylic acid, propylacrylic acid, other alkylacrylic acids, the mono- or poly-unsaturated fatty acids and polyacids as described in U.S. application Ser. No. 10/859,537, the disclosure of which is incorporated herein by reference, and anhydrides thereof. Non-limiting examples of acidic organosulfur compounds and acidic organophosphorous compounds include vinylsulfonic acid, vinylphosphonic acid.

One group of acidic crosslinkable and/or polymerizable compounds may have a structure of $[X(L)_pR]_m[(L)_qA]_n$, where X is the same or different monovalent radicals that are crosslinkable and/or polymerizable; L is the same or different divalent radicals, preferably —COO— or —CONH—; R is the same or different radicals having a valency of 2, 3, or 4, and up to 6, comprising 1 to 30 carbon atoms, optionally comprising ether, ester, and/or amide linkages; A is the same or different monovalent acidic radicals or divalent acidic radicals; m and n are integers independently chosen from 1, 2, 3, 4, and up to 8, with m+n being 2, 3, or 4, and up to 10; p is the same or different numbers of 0 or 1; and q is the same or different numbers of 0 or 1. Non-limiting examples of X include linear, branched, or cyclic $C_{2-10}$ alkenyls, such as vinyl, allyl, isoallyl, propenyl, and isopropenyl. Non-limiting examples of R include —CH$_2$—, —(CH$_2$)$_2$—, —(CH$_2$)$_4$—, —(CH$_2$)$_6$—, —(CH$_2$)$_8$—, —(CH$_2$)$_{10}$—, —(CH$_2$)$_{20}$—, —(CH$_2$)$_2$O(CH$_2$)$_2$—, —(CH$_2$)$_2$O[O(CH$_2$)$_2$]$_2$—, —(CH$_2$)$_2$OCO(CH$_2$)$_2$COO(CH$_2$)$_3$—, —(CH$_2$)$_2$O[O(CH$_2$)$_2$]$_6$—,

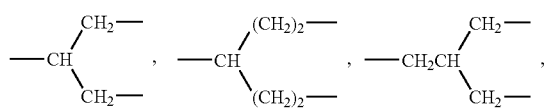

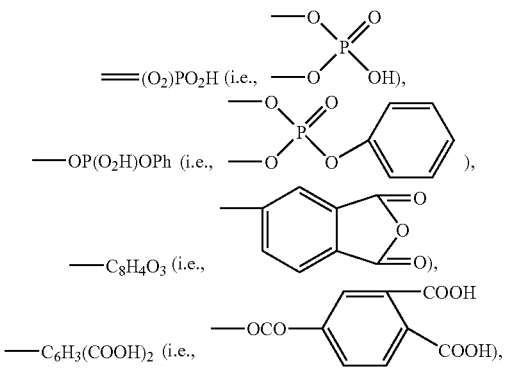

(x, y, and z are independent whole numbers of 0, 1, 2, and up to 10, and x+y+z is an averaged number of 1 or greater, or 3.5 or greater), and combinations of 2 or more thereof. Non-limiting examples of A include —COOH, —CH(COOH)$_2$, —SO$_3$H, —OPO$_3$H$_2$, =(O$_2$)PO$_2$H (i.e., —O—P(=O)(—OH)—O—), —OP(O$_2$H)OPh (i.e., —O—P(=O)(—OPh)—O—), —C$_8$H$_4$O$_3$ (i.e., phthalide structure), —C$_6$H$_3$(COOH)$_2$ (i.e., —OCO—C$_6$H$_3$(COOH)$_2$), and combinations of two or more thereof.

Non-limiting examples of acidic compounds with the above-described structure include CH$_2$=C(R)CONH(CH$_2$)$_2$COOH, CH$_2$=C(R)CONH(CH$_2$)$_{10}$CH(COOH)$_2$, CH$_2$=CHC$_6$H$_4$CH$_2$COOH, CH$_2$=C(R)COO(CH$_2$)$_8$CH(COOH)$_2$, CH$_2$=C(R)COO(CH$_2$)$_{10}$CH(COOH)$_2$, CH$_2$=CHC$_6$H$_4$COOH, CH$_2$=C(R)CONH(CH$_2$)$_2$OPO$_3$H$_2$, CH$_2$=C(R)COO(CH$_2$)$_{12}$CH(COOH)$_2$, CH$_2$=CHC$_6$H$_4$(CH$_2$)$_2$COOH, CH$_2$=C(R)COO(CH$_2$)$_2$OCOC$_6$H$_3$(COOH)$_2$, CH$_2$=C(R)COO(CH$_2$)$_2$OPO$_3$H$_2$, CH$_2$=CHC$_6$H$_4$SO$_3$H, CH$_2$=C(R)COO(CH$_2$)$_2$OCOC$_8$H$_4$O$_3$, CH$_2$=C(R)COO(CH$_2$)$_2$OP(O$_2$H)OPh, CH$_2$=CHC$_6$H$_4$CH$_2$SO$_3$H, [CH$_2$=C(R)COO(CH$_2$)$_2$O]$_2$CHOCOC$_6$H$_3$(COOH)$_2$, [CH$_2$=C(R)COO(CH$_2$)$_2$O]$_3$COCOC$_6$H$_3$(COOH)$_2$, CH$_2$=C(R)COO(CH$_2$)$_2$OCO(CH$_2$)$_2$COOCH$_2$CH[CH2OCOC(R)=CH$_2$]OCOC$_6$H$_3$(COOH)$_2$, [CH$_2$=C(R)COOCH$_2$CH[OCOC$_6$H$_3$(COOH)$_2$]CH$_2$OCH$_2$]$_2$, CH$_2$=C(R)CONHC(CH$_3$)$_2$CH$_2$SO$_3$H, [CH$_2$=C(R)COO(CH$_2$)$_2$O]$_2$C[CH$_2$OCOC$_6$H$_3$(COOH)$_2$]$_2$, CH$_2$=C(R)COOC(CH$_3$)$_2$CH$_2$SO$_3$H, [CH$_2$=C(R)COO(CH$_2$)$_2$O]$_2$PO$_2$H, CH$_2$=C(R)CONH(CH$_2$)$_2$SO$_3$H, CH$_2$=C(R)COO(CH$_2$)$_{10}$SO$_3$H, CH$_2$=C(R)COO(CH$_2$)$_2$SO$_3$H, CH$_2$=C(R)COO(CH$_2$)$_6$SO$_3$H, CH$_2$=C(R)CONHC$_6$H$_4$SO$_3$H, CH$_2$=C(R)COOC$_6$H$_4$SO$_3$H,

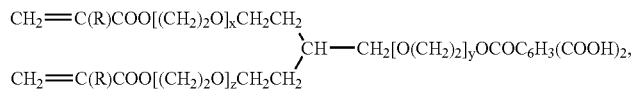

and combinations of two or more thereof (e.g., combinations of P-containing acidic compounds and carboxyl-containing acidic compounds).

Salts of the acidic compounds described above are another group of crosslinkable and/or polymerizable compounds. Suitable cations of such salts include any and all of those disclosed herein, such as metal cations and amine-based cations. Metal salts may be derived by reacting the acidic compounds with monovalent and/or divalent metal oxides. Other salts include, for example, reaction products of divalent metal oxide with a) mono-basic unsaturated carboxylic acids such as acrylic acid and/or methacrylic acid and/or b) di-basic and/or polybasic carboxylic acids having mono- or polyunsaturation, and/or anhydrides thereof, such as those described in U.S. Pat. No. 6,566,483, the entire disclosure of which is incorporated herein by reference. Non-limiting examples include zinc diacrylthioic acid.

Acidic compounds described herein can be condensed with polyamines (forming polyamides), polyols (forming polyesters), or aminoalcohols (forming esteramides) to form acidic or non-acidic polyfunctional crosslinkable and/or polymerizable compounds suitable for use in the compositions of the present disclosure. Non-limiting examples of unsaturated carboxylic acid condensates include ethyleneglycol di(meth)acrylate, diethyleneglycol di(meth)acrylate, triethyleneglycol di(meth)acrylate, tetraethyleneglycol di(meth)acrylate, nonaethyleneglycol di(meth)acrylate, polyethyleneglycol di(meth)acrylate, propyleneglycol di(meth)acrylate, dipropyleneglycol di(meth)acrylate, tripropyleneglycol di(meth)acrylate, neopentylglycol di(meth)acrylate, 1,4-butanediol di(meth)acrylate, 1,6-hexanediol di(meth)acrylate, 1,9-nonanediol di(meth)acrylate, trimethylolpropane di(meth)acrylate, trimethylolpropane tri(meth)acrylate, glyceryl di(meth)acrylate, glyceryl tri(meth)acrylate, pentaerythritol di(meth)acrylate, pentaerythritol tri(meth)acrylate, pentaerythritol tetra(meth)acrylate, urethane di(meth)acrylate, epoxy (meth)acrylate, bisphenol A diglycidylether diacrylate, allyl (meth)acrylate, 2,2'-bis[4-(meth)acryloyloxyethoxyphenyl]propane, 2,2'-bis[4-(meth)acryloyloxyethoxyethoxyphenyl]propane, 2,2'-bis{4-[3-(meth)acryloyloxy-2-hydroxypropoxy]phenyl}propane.

Non-limiting example of bismaleimide include N,N'-m-phenylenedimaleimide (HVA-2, available from Dupont). Non-limiting examples of allyl esters include triallyl cyanurate (Akrosorb® 19203, available from Akrochem Corp. of Akron, Ohio), triallyl isocyanurate (Akrosorb® 19251, also available from Akrochem Corp.), and triallyl trimaletate (TATM, available from Sartomer Company of Exton, Pa.). Non-limiting examples of mono- or polyunsaturated polycarboxylic acids and derivatives thereof include citraconic acid, itaconic acid, fumaric acid, maleic acid, mesaconic acid, aconitic acid, maleic anhydride, itaconic anhydride, citraconic anhydride, poly(meth)acrylic acid, polyitaconic acid, copolymers of (meth)acrylic acid and maleic acid, copolymers of (meth)acrylic acid and styrene, and fatty acids having a $C_6$ or longer chain, such as hexadecenedioic acid, octadecenedioic acid, vinyl-tetradecenedioic acid, eicosedienedioic acid, dimethyl-eicosedienedioic acid, 8-vinyl-10-octadecenedioic acid, anhydrides thereof, methyl, ethyl, and other linear or branched alkyl esters thereof, amides thereof, esteramides thereof, and mixtures thereof.

Liquid vinyl polydienes are liquid at ambient temperature, such as liquid vinyl polybutadiene homopolymers and copolymers (e.g., having a vinyl-1,2 content of at least 60%, or at least 65%), and can have low to moderate viscosity, low volatility and emission, high boiling point (such as greater than 300° C.), and molecular weight of about 1,000 to about 5,000, such as about 1,800 to about 4,000, or about 2,000 to about 3,500. Non-limiting examples of liquid vinyl polydienes include high vinyl polybutadiene having a vinyl-1,2 content of 90% and a molecular weight of about 3,200, high vinyl polybutadiene having a vinyl-1,2 content of 70% and a molecular weight of about 2,400, high vinyl poly(butadiene-styrene) copolymer having a vinyl-1,2 content of 70% and a molecular weight of about 2,400, and other liquid vinyl polymers as disclosed herein above.

Another group of crosslinkable and/or polymerizable compounds is ethylenically unsaturated organosulfur compounds, which may or may not comprise one or more heterocyclic structures, and include, without limitation, compounds having mercapto groups and tautomers thereof, such as thiouracils, triazinedithions, and mercaptothiazoles. Generic structures of such organosulfurs may include $[X(Y)_w R(R_s)_x]_y(S)_z$, where X is the same or different monovalent radicals that are crosslinkable and/or polymerizable; Y is the same or different divalent radicals chosen from —COO—, —CH$_2$O—, and —C$_6$H$_4$CH$_2$O—; R is the same or different divalent; $R_s$ is the same or different sulfur-containing radicals; w is 0 or 1; x is 0 or 1; y is 1 or 2; z is 0 or 1; and x+z=1. Non-limiting examples of X include linear, branched, or cyclic $C_{2-10}$ alkenyls, such as vinyl, allyl, isoallyl, propenyl, and isopropenyl. Non-limiting examples of R include —CH$_2$C$_6$H$_4$CH$_2$—, —(CH$_2$)$_2$O(CH$_2$)$_2$—, —C$_6$H$_4$CH$_2$—, —(CH$_2$)$_x$Si(CH$_3$)$_2$OSi(CH$_3$)$_2$(CH$_2$)$_y$— where x and y are the same or different integers of 1 to 5, $C_{1-12}$ saturated hydrocarbons (such as linear, branched, and/or cyclic alkylenes, like —(CH$_2$)$_6$—, —(CH$_2$)$_{10}$—, —CH$_2$)$_{11}$—,

Non-limiting examples of $R_s$ include

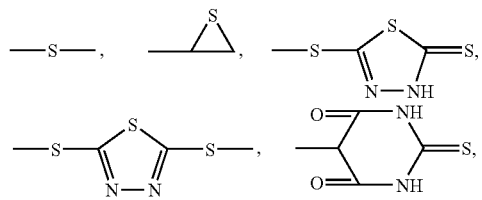

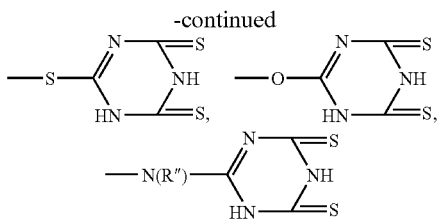

where R" is H or

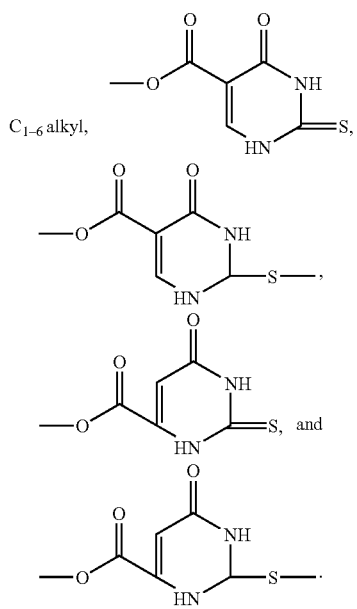

Non-limiting examples of such organosulfurs include thioethers and polysulfides of the above structures, and acryloxy-4-thiophenol, zinc acryloxythiophenol, bis(4-acryloxybenzene)disulfide, diallyl disulfide, diallyl trisulfide, methyl allyl sulfide, pentachlorophenyl vinyl sulfide, pentachlorophenyl vinyl sulfoxide, tetrachloro(vinylthio)benzenethiol. Other examples may have one of the organosulfur structures disclosed herein above, wherein at least one of the substituents $R_1$ to $R_5$ (preferably $R_2$, $R_3$, and/or $R_4$) and/or at least one of the substituents $R_6$ to $R_{10}$ (preferably $R_7$, $R_8$, and/or $R_9$) each comprises at least one crosslinkable and/or polymerizable radical X as described above.

Aromatic crosslinkable and/or polymerizable compounds further include those having the diaryl ether structure described above, wherein at least one of the substituents $R_1$ to $R_5$ (preferably $R_2$, $R_3$, and/or $R_4$) and/or at least one of the substituents $R_6$ to $R_{10}$ (preferably $R_7$, $R_8$, and/or $R_9$) each comprises at least one crosslinkable and/or polymerizable radical X as described above, and cinnamyl alcohol, cinnamic aldehyde, methoxycinnamic aldehyde, cinnamyl methyl ether, cinnamyl ethyl ether, cinnamyl allyl ether, cinnamyl phenyl ether, cinnamyl benzyl ether, cinnamyl naphthyl ether, cinnamyl methyl ketone, cinnamyl ethyl ketone, cinnamyl allyl ketone, cinnamyl phenyl ketone, cinnamyl benzyl ketone, cinnamyl acetate, cinnamyl propionate, cinnamyl butylate, cinnamyl benzoate, methyl cinnamate, methyl methylcinnamate, ethyl cinnamate, vinyl cinnamate, allyl cinnamate, phenyl cinnamate, benzyl cinnamate, cinnamyl cinnamate, naphthyl cinnamate, cinnamyl methyl carbonate, cinnamyl phenyl carbonate, allylbenzene, allyl phenyl ether, allyl benzoate, allyl phenylacetate.

Non-limting examples of other crosslinkable and/or polymerizable compounds include styrene, α-methylstyrene, and derivatives thereof (e.g., p-chlorostyrene, p-hydroxystyrene, divinyl-benzene), fumaric acid esters (e.g., monomethyl fumarate, diethyl fumarate, diphenyl fumarate), allyl esters (e.g., diallyl phthalate, diallyl terephthalate, diallyl carbonate, allyl diglycol carbonate), epoxies (e.g., diglycerol polyglycidyl ether, pentaerythritol polyglycidyl ether, 1,4-bis(2,3-epoxypropoxyperfluoroisopropyl)cyclohexane, sorbitol polyglycidyl ether, trimethylolpropane polyglycidyl ether, resorcine diglycidyl ether, 1,6-hexanediol diglycidyl ether, polyethylene glycol diglycidyl ether, phenyl glycidyl ether, p-t-butylphenyl glycidyl ether, adipic acid diglycidyl ether, o-phthalic acid diglycidyl ether, dibromophenyl glycidyl ether, 1,2,7,8-diepoxyoctane, 4,4,'-bis(2,3-epoxypropoxyperfluoroisopropyl)diphenyl ether, 3,4-epoxycyclohexylmethyl-3',4'-epoxycyclo-hexane carboxylate, 3,4-epoxycyclohexyloxysilane, ethylene glycol-bis(3,4-epoxycyclohexane carboxylate)), oxetanes (e.g., 3-ethyl-3-hydroxymethyloxetane, 3-ethyl-3-(phenoxymethyl)oxetane, 3-ethyl-3-(naphthoxymethyl)oxetane, di[1-ethyl(3-oxetanyl)]methyl ether, 3-ethyl-3-(2-ethylhexyl-oxymethyl)oxetane, 1,4-bis{[(3-ethyl-3-oxetanyl)methoxy]methyl}benzene), vinyl ethers (e.g., vinyl 2-chloroethyl ether, vinyl n-butyl ether, triethylene glycol divinyl ether, 1,4-cyclohexanedimethanol divinyl ether, trimethylolethane trivinyl ether, vinyl glycidyl ether), and silanes (e.g., γ-methacryloxypropyltrimethoxysilane, ε-methacryloxyoctyltrimethoxysilane, vinyltrimethoxysilane, and those described in co-owned and co-pending U.S. application Ser. No. 10/120,012, now U.S. Publication No. 2003/0004013, the entirety of which is incorporated herein by reference).

In one example, an additive, which serves at least as a crosslink co-agent, includes a metal salt, such as a zinc salt or a magnesium salt, of an unsaturated acid having 3 to 8 carbon atoms, such as acrylic acid and methacrylic acid. Examples include, but are not limited to, one or more metal salts of diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, zinc dimethacrylate, and mixtures thereof. The crosslink co-agent is typically present in an amount greater than about 10 phr, preferably from about 20 phr to about 40 phr, more preferably from about 25 phr to about 35 phr.

In another example, the additive serves to increase the CoR of the core and/or the golf ball, and includes hypervalent iodines (e.g., diphenyliodonium iodide), Se-containing compounds (e.g., diphenyl diselenide), Sn-containing compounds (e.g., diphenyltin dichloride), and sulfonamides (e.g., sulfamide). Some of these additives (e.g., hypervalent iodines, Sn-containing compounds, and sulfonamides) may be used in amounts equal to or greater than that of the crosslink initiators (e.g., peroxides), with a weight ratio of the additive to the crosslink initiator being 1:1 or greater, preferably 1.5:1 or greater, more preferably from 2:1 to 10:1, most preferably from 2:1 to 6:1. Alternatively, such additives may be used in amounts of 0.1 phr or greater, preferably from 0.5 phr to 10 phr, more preferably from 1 phr to 5 phr, most preferably from 1.5 phr to 3 phr. Other additives (e.g., Se-containing compounds) may be used in amounts less than that of the crosslink initiators (e.g., peroxides), with a weight ratio of the additive to the crosslink initiator being 0.5:1 or less, preferably from 0.05:1 to 0.3:1, more preferably from 0.1:1 to 0.2:1. Alternatively, such additives may be used in amounts of 0.5 phr or less, preferably from 0.05 phr to 0.5, more preferably from 0.1 phr to 0.3 phr, more preferably from 0.15 phr to 0.3 phr.

Also useful in the core are isocyanate-containing compounds (e.g., monomeric compounds like p-tolune sulfonyl isocyanate (PTSI from VanDeMark Inc. of Lockport, N.Y.) and polymeric compounds like polymeric methylene diphenyl diisocyanate (PAPI® MDI from Dow Chemical)), oxazolidines, oxazolanes, orthoformates (e.g., trimethyl- and triethyl orthoformates), orthoacetates (e.g., trimethyl- and triethyl orthoacetates), vinyl silanes, solution-converted polybutadienes as described in co-owned and co-pending U.S. application Ser. No. 10/807,846, and metallic mercaptothiazoles and metallic mercaptobenzothiazoles as described in co-owned and co-pending U.S. application Ser. Nos. 10/437,386 and 10/437,387. The entire disclosures of these applications are incorporated herein by reference.

Another group of additives are fillers, which may include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like. Fillers added to one or more portions of the golf ball typically include processing aids or compounds to affect rheological and mixing properties, density-modifying fillers, tear strength, or reinforcement fillers, and the like. The fillers may be inorganic, and include numerous metals or metal oxides, such as zinc oxide and tin oxide, as well as barium sulfate, zinc sulfate, calcium carbonate, barium carbonate, clay, tungsten, tungsten carbide, an array of silicas (e.g., quartz, silica, silica-alumina, silica-titania, silica-zirconia, silica-magnesia, silica-calcia, silica-barium oxide, silica-strontium oxide, silica-titania-sodium oxide, silica-titania-potassium oxide), titania, zirconia, alumina, and mixtures thereof. Fillers may also include various foaming agents or blowing agents which may be readily selected by one of ordinary skill in the art. Fillers may include polymeric, ceramic, metal, and glass microspheres may be solid or hollow, and filled or unfilled. Organic filler may include polymethyl methacrylate, polyethyl methacrylate, methyl methacrylate-ethyl methacrylate copolymer, ethyl methacrylate-butyl methacrylate copolymer, methyl methacrylate-trimethylolpropane methacrylate copolymer, polyvinyl chloride, polystyrene, chlorinated polyethylene, nylon, polysulfone, polyethersulfone, and polycarbonate. Fillers are typically also added to one or more portions of the golf ball to modify the density thereof to conform to uniform golf ball standards. Fillers may also be used to modify the weight of the center or at least one additional layer for specialty balls, e.g., a lower weight ball is preferred for a player having a low swing speed.

The additives disclosed herein may be used singly or as a combination of two or more thereof. The use of two or more additives chosen from different groups may independently or synergistically provide a single or two or more desired effects. The amount of each additive, when present in the composition, may be adjusted to optimize the desired effects. In one example, the amount is 0.1 phr to 5 phr by weight of the base polymer in the composition.

The compositions described above may be used in any one or more golf ball portions present in any construction, such as the inner center, inner core layer, intermediate core layer, outer core layer, intermediate layer, inner cover layer, intermediate cover layer, outer cover layer, and the like and equivalents thereof. In one example, the polybutadiene-based composition can be used to form a durable, cut resistant, and scuff resistant outer cover layer of a golf ball. Such an outer cover layer may constitute the entire cover of the golf ball by itself (i.e., a single layer cover) or form a multi-layer cover with one or more inner cover layer(s) and/or intermediate cover layer(s). This outer cover layer can have a thickness from 0.001 inches to 0.125 inches, preferably from 0.005 inches to 0.1 inches, more preferably from 0.01 inches to 0.05 inches, most preferably from 0.015 inches to 0.04 inches, like 0.035 inches. This outer cover layer may have a low flexural modulus of 50,000 psi or less, preferably from 1,000 psi to 30,000 psi, more preferably from 2,000 psi to 25,000 psi. The Shore D hardness of this outer cover layer may be from 20 to 60, preferably from 25 to 55, more preferably from 30 to 55, most preferably from 40 to 55.

In one example, a golf ball layer (e.g., core, intermediate layer) comprises: a) 100 parts by weight of a polybutadiene or a blend of two or more different polybutadienes, preferably those with high cis content as disclosed herein; b) a free radical initiator, in an amount of 3 phr or less, preferably from 0.1 phr to 2 phr, more preferably 1 phr or less, further preferably 0.8 phr or less, even further preferably 0.5 phr or less; c) an arylthiol, preferably chosen from CoPFTP, CoPCTP, CoPBTP, ZnPFTP, ZnPBTP, or a combination of two or more thereof, in an amount of 3 phr or less, preferably from 0.1 phr to 2 parts or less, more preferably 1.1 phr or less; optionally d) a crosslink co-agent, preferably a metal salt of an unsaturated carboxylic acid, such as ZDA, ZDMA, or a combination thereof, in an amount of 20 phr or more, preferably 25 phr or more, more preferably 30 phr or more, further preferably 35 phr or more, like 40 phr; optionally e) a metal oxide, preferably ZnO; and optionally f) a filler, preferably baryte (BaSO4). Such a composition may form, at least in part, a golf ball core having a diameter of 1.5 inches or greater, preferably 1.54 inches or greater, more preferably 1.545 inches or greater, most preferably 1.55 inches or greater. The core may have an Atti compression of 40 to 90, preferably 45 to 85, more preferably 50 to 80, further preferably 50 to 75, even more preferably 50 to 65, most preferably 55 to 60; alternatively, the compression may be 25 or less. The core may have a CoR of 0.75 or greater, preferably 0.77 or greater, more preferably 0.79 or greater, further preferably 0.8 or greater, and most preferably 0.81 or greater. The core may comprise a center and one or more outer core layers. The outer core layer may have a thickness of 0.5 inches or less, preferably 0.3 inches or less, more preferably 0.25 inches to 0.3 inches.

The materials used in forming either the golf ball center or any portion of the core may be combined to form a mixture by any type of mixing known to one of ordinary skill in the art. Suitable types of mixing include single pass and multi-pass mixing. Suitable mixing equipment is well known to those of ordinary skill in the art, and such equipment may include a Banbury mixer, a two-roll mill, or a twin screw extruder. Conventional mixing speeds for combining polymers are typically used. The mixing temperature depends upon the type of polymer components, and more importantly, on the type of free-radical initiator. Suitable mixing speeds and temperatures are well-known to those of ordinary skill in the art, or may be readily determined without undue experimentation.

The mixture can be subjected to, e.g., a compression or injection molding process, to obtain solid spheres for the center or hemispherical shells for forming an intermediate layer. The temperature and duration of the molding cycle are selected based upon reactivity of the mixture. The molding cycle may have a single step of molding the mixture at a single temperature for a predetermined time period. The molding cycle may also include a two-step process, in which the polymer mixture is held in the mold at an initial temperature for an initial period of time, followed by holding at a second, typically higher temperature for a second period of time. In one example, a single-step cure cycle is employed. The materials used in forming either the golf ball center or any portion of the core may be combined to form a golf ball by an injection molding process, which is also well-known to one of ordinary skill in the art. Although the curing time depends on the various materials selected, those of ordinary skill in the art will be readily able to adjust the curing time upward or downward based on the particular materials used and the discussion herein.

The cover typically has a thickness to provide sufficient strength, good performance characteristics, and durability. The cover preferably has a thickness of less than about 0.1 inches, more preferably, less than about 0.05 inches, and most preferably, between about 0.02 inches and about 0.04 inches. A preferred construction of a multilayer golf ball comprises a core, an inner cover layer, and an outer cover layer. Preferably, at least one of the inner and outer cover layers has a thickness of less than about 0.05 inches, more preferably between about 0.02 inches and about 0.04 inches, most preferably about 0.03 inches.

Inner cover layer can be formed from a hard, high flexural modulus, resilient material which contributes to the low spin, distance characteristics when they are struck for long shots (e.g. driver or long irons). The inner cover layer materials can have a Shore D hardness of 65-80, preferably 69-74, more preferably 70-72. The flexural modulus of inner cover layer can be at least 65,000 psi, preferably from 70,000 psi to 120,000 psi, more preferably from 75,000 psi to 100,000 psi. The thickness of the inner cover layer may be from 0.020 inches to 0.045 inches, preferably from 0.030 inches to 0.040 inches.

Outer cover layer can be formed from a relatively soft thermoset material in order to replicate the soft feel and high spin play characteristics of a balata ball for "short game" shots. The outer cover layer can have Shore D hardness of less than 65, preferably 30-60, more preferably 35-50, most preferably 40-45. Additionally, the materials of the outer cover layer can have a degree of abrasion resistance in order to be suitable for use as a golf ball cover. The outer cover layer of the present disclosure can comprise any suitable thermoset material, which can be formed from a castable reactive liquid material. The materials for the outer cover layer include, but are not limited to, thermoset urethanes and polyurethanes, thermoset urethane ionomers, thermoset urethane epoxies, and polyureas.

When the golf ball includes an inner cover layer, this layer can include any materials known to those of ordinary skill in the art, including thermoplastic and thermosetting material, such as ionic copolymers or terpolymers of ethylene and methacrylic acid or acrylic acid partially or fully neutralized, having cations of zinc, sodium, lithium, magnesium, potassium, calcium, manganese, nickel or the like. The golf ball can likewise include one or more homopolymeric or copolymeric inner cover materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes and polyureas, such as those prepared from polyols or polyamines and diisocyanates or polyisocyanates;

(4) Polyamides, such as poly(hexamethylene adipamide) and others prepared from diamines and dibasic acids, as well as those from amino acids such as poly(caprolactam), and blends of polyamides with SURLYN, polyethylene, ethylene copolymers, ethyl-propylene-non-conjugated diene terpolymer, and the like;

(5) Acrylic resins and blends of these resins with poly vinyl chloride, elastomers, and the like;

(6) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by ELF Atochem of Philadelphia, Pa.;

(7) Polyphenylene oxide resins or blends of polyphenylene oxide with high impact polystyrene as sold under the trademark NORYL by General Electric Company of Pittsfield, Mass.;

(8) Thermoplastic polyesters, such as polyethylene terephthalate, polybutylene terephthalate, polyethylene terephthalate/glycol modified and elastomers sold under the trademarks HYTREL by E.I. DuPont de Nemours & Co. of Wilmington, Del., and LOMOD by General Electric Company of Pittsfield, Mass.;

(9) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(10) Blends of thermoplastic rubbers with polyethylene, propylene, polyacetal, nylon, polyesters, cellulose esters, and the like.

Preferably, the inner cover includes polymers, such as ethylene, propylene, butene-1 or hexane-1 based homopolymers or copolymers including functional monomers, such as acrylic and methacrylic acid and fully or partially neutralized ionomer resins and their blends, methyl (meth)acrylate homopolymers and copolymers, imidized and amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly(tetrafluoroethylene) and their copolymers including functional comonomers, and blends thereof. Suitable inner cover compositions also include thermoplastic or thermoset polyurethanes, and thermoplastic or thermoset polyureas, such as those described in co-owned and co-pending U.S. application Ser. No. 10/859,537, now U.S. Publication No. 2005/0004325, the entire disclosure of which is incorporated herein by reference.

To prevent or minimize the penetration of moisture, typically water vapor, into core of golf ball, an intermediate moisture vapor barrier layer may also be disposed around core. The moisture vapor barrier layer preferably has a moisture vapor transmission rate that is lower than that of the cover, and more preferably less than the moisture vapor transmission rate of an ionomer resin such as Surlyn®, which is in the range of about 0.45 to about 0.95 (g·mm)/(m$^2$·day). The moisture vapor transmission rate is defined as the mass of moisture vapor that diffuses through a material of a given thickness per unit area per unit time. The preferred standards of measuring the moisture vapor transmission rate include ASTM F1249-90 entitled "Standard Test Method for Water Vapor Transmission Rate Through Plastic Film and Sheeting Using a Modulated Infrared Sensor," and ASTM F372-99 entitled "Standard Test Method for Water Vapor Transmission Rate of Flexible Barrier Materials Using an Infrared Detection Technique," among others. The moisture vapor barrier layer can be formed from any materials and compositions disclosed herein that meets the desired vapor transmission rate. Other suitable compositions for the moisture vapor barrier layer further include those described in co-owned and co-pending U.S. application Ser. No. 10/611,833, now U.S. Publication No. 2004/0048688, the entire disclosure of which is incorporated herein by reference.

Any of the inner or outer cover layers may also be formed from polymers containing $\alpha,\beta$-unsaturated carboxylic acid groups, or ionic derivatives thereof, that have been blended with organic fatty acids or salts thereof and a suitable cation source. The acid moieties of the highly-neutralized polymers ("HNP"), typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, or by the salts of organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like.

The acid copolymers and ionomers thereof can be described as E/X/Y copolymers where E is ethylene, X is an $\alpha,\beta$-ethylenically unsaturated carboxylic acid, and Y is a softening comonomer. For example, X is acrylic or methacrylic acid and Y is a $C_{1-8}$ alkyl acrylate or methacrylate ester. X is present in an amount of greater than 0 to 50% by weight of the polymer, preferably from 1% to 35%, more preferably from 5% to 30%, further preferably from 10% to 20%, althernatively from 5% to 15%. Y is present in an amount from about 0 to 50% by weight of the polymer, more preferably from 5% to 45%, further preferably from 8% to 35%, even further preferably from 5% to 25%, most preferably from 10% to 20%, alternatively from 17% to 40%, like from 24% to 35%.

The organic fatty acids are aliphatic, mono-functional (saturated, unsaturated, or multi-unsaturated) organic fatty acids. Salts of these organic fatty acids may also be employed. The salts of organic fatty acids include barium, lithium, sodium, zinc, bismuth, chromium, cobalt, copper, potassium, strontium, titanium, tungsten, magnesium, cesium, iron, nickel, silver, aluminum, tin, or calcium, salts of fatty acids like stearic acid, behenic acid, erucic acid, oleic acid, linoelic acid, caproic acid, caprylic acid, capric acid, lauric acid, or dimerized derivatives thereof. It is preferred that the organic fatty acids and salts thereof are relatively non-migratory (they do not bloom to the surface of the polymer under ambient temperatures) and non-volatile (they do not volatilize at temperatures required for melt-blending).

The HNP may be blended with thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients. The thermoplastic components can be blended in either before, during, or after the acid moieties are neutralized. Examples of these materials are disclosed in U.S. Patent Application Publication Nos. 2001/0018375 and 2001/0019971, which are incorporated herein, in their entirety, by express reference thereto.

Preferably, the melt index (MI) of the base ionomer resin is 20 dg/min or greater, more preferably 40 dg/min or greater, further preferably 75 dg/min or greater, most preferably 150 dg/min or greater. Particular examples of soft and resilient ionomers include partially neutralized ethylene/(meth)acrylic acid/butyl (meth)acrylate copolymers having an MI and level of neutralization that results in a melt processible polymer that has useful physical properties. The copolymers may be neutralized by one or more alkali metal, transition metal, or alkaline earth metal cations. Cations comprise lithium, sodium, potassium, magnesium, calcium, barium, or zinc, or a combination of such cations. Preferably, an amount of cation source in excess of the amount required to neutralize 100% of all the acid moieties in the ionomer blend is used.

The organic fatty acids or salts thereof are added in an amount sufficient to enhance the resilience of the copolymer. Preferably, the organic fatty acids or salts thereof are added in an amount sufficient to substantially remove remaining ethylene crystallinity of the copolymer. Preferably, the fatty organic acids or salts are added in an amount of at least about 5% by weight of the total amount of copolymer and organic acid(s). More preferably, the organic fatty acids or salts thereof are added in an amount of at least about 15%, even more preferably at least about 20%. Preferably, the organic fatty acid(s) are added in an amount up to about 50% by weight of the total amount of copolymer and organic fatty acid(s). More preferably, the organic fatty acids or salts thereof are added in an amount of up to about 40%, more preferably, up to about 35%. The non-volatile, non-migratory organic fatty acids preferably are one or more aliphatic, mono-functional, saturated or unsaturated organic fatty acids having less than 36 carbon atoms or salts thereof.

Processes for fatty acid/fatty salt modifications are known in the art. Particularly, the modified highly-neutralized soft, resilient acid copolymer ionomers can be produced by: (a) melt-blending (1) ethylene, $\alpha,\beta$-ethylenically unsaturated $C_{3-8}$ carboxylic acid copolymer(s) or melt-processible ionomer(s) thereof that have their crystallinity disrupted by addition of a softening monomer or other means with (2) sufficient amount of non-volatile, non-migratory organic fatty acids to substantially enhance the resilience and to disrupt (preferably remove) the remaining ethylene crystallinity, and then concurrently or subsequently (b) adding a sufficient amount of a cation source to increase the level of neutralization of all the acid moieties (including those in the acid copolymer and in the organic fatty acid, if present) to 70% or greater, preferably 80% or greater, more preferably 90% or greater, most preferably 100% or greater.

The weight ratio of X to Y in the composition is at least about 1:20. Preferably, the weight ratio of X to Y is at least about 1:15, more preferably, at least about 1:10. Furthermore, the weight ratio of X to Y is up to about 1:1.67, more preferably up to about 1:2. Most preferably, the weight ratio of X to Y in the composition is up to about 1:2.2. Specific acid-copolymers include ethylene/(meth)acrylic acid/n-butyl (meth)acrylate, ethylene/(meth)acrylic acid/iso-butyl (meth)acrylate, ethylene/(meth)acrylic acid/methyl (meth)acrylate, and ethylene/(meth)acrylic acid/ethyl (meth)acrylate terpolymers.

The optional filler may be inorganic having a density of greater than about 4 g/cm$^3$, preferably greater than 5 g/cm$^3$, and in amounts between 0 to about 60% based on the total weight of the composition. Examples of useful fillers include zinc oxide, barium sulfate, lead silicate and tungsten carbide, as well as the other well-known fillers used in golf balls. It is preferred that the filler materials be non-reactive or almost non-reactive and not stiffen or raise the compression nor reduce the coefficient of restitution significantly. Additional optional additives that are useful herein include acid copolymer wax (e.g., Allied wax AC 143, believed to be a 16-18% acid ethylene/acrylic acid copolymer with a number average molecular weight of 2,040), which may assist in preventing reaction between the filler materials (e.g., ZnO) and the acid moiety in the ethylene copolymer. Other optional additives include $TiO_2$, which is used as a whitening agent, optical brighteners, surfactants, processing aids, etc.

While the outer cover may be formed of any of the above-listed materials, the outer cover preferably includes a polyurethane, polyurea, or epoxy composition, generally comprising the reaction product of at least one polyisocyanate, at least one telechelic polyahl, and at least one curing agent. Suitable outer cover compositions include thermoplastic or thermoset polyurethanes and thermoplastic or thermoset polyureas, such as those described in co-owned and co-pending U.S. application Ser. No. 10/859,537, now U.S. Publication No. 2005/0004325, the entire disclosure of which is incorporated herein by reference.

The resultant golf balls typically have a CoR of greater than about 0.7, preferably greater than about 0.75, more preferably greater than about 0.78, most preferably about 0.8 or greater. The golf balls also typically have an Atti compression of at least about 40, preferably from about 50 to 120, and more preferably from about 60 to 100. The golf balls typically have dimple coverage greater than about 60 percent, preferably greater than about 65 percent, and more preferably greater than about 75 percent. The material of the outer cover layer may have a material hardness, as measured by ASTM-D2240, of less than about 45 Shore D, preferably less than about 40 Shore D, more preferably between about 25 and about 40 Shore D, and most preferably between about 30 and about 40 Shore D. Alternatively, the material of the outer cover layer may have a material hardness of less than about 60 Shore D, preferably less than about 55 Shore D, and more preferably between about 40 and about 55 Shore D. The intermediate layer or inner cover layer preferably has a material hardness of less than about 70 Shore D, more preferably between about 30 and about 70 Shore D, and most preferably, between about 50 and about 65 Shore D.

The core or center may have an Atti compression of less than 100, preferably 90 or less, more preferably between 40 and 80, and most preferably between 50 and 70. In an alternative, low compression embodiment, the core or center may have a compression of less than 25. The overall outer diameter of the core may be 1.650 inches or less, preferably 1.620 inches or less, more preferably between 1.500 inches and 1.620 inches, and most preferably between 1.540 inches and 1.590 inches. The outer diameter of the intermediate layer or inner cover layer of the golf balls is preferably between 1.580 inches and 1.640 inches, more preferably between 1.590 inches and 1.630 inches, and most preferably between 1.600 inches and 1.630 inches. The diameter of the golf ball is preferably from 1.680 inches to 1.800 inches, more preferably from 1.680 inches to 1.760 inches, most preferably from 1.680 inches to 1.740 inches.

EXAMPLES

Solid cores each having an outer diameter of 1.55 inches were formed from compositions detailed in Table I (ingredient amounts listed in phr) and compared to controls in compression and CoR at 125 ft/sec. The results are listed in Table I below and plotted in FIG. 1, which demonstrate reduced compression and/or enhanced CoR with the addition of diphenyliodonium iodide. In general, compositions (e.g., Ex. 10 and 11) that can provide data points above the extrapolated solid line of the control cores in FIG. 1 are preferred.

TABLE I

|  | Control 1 | Control 2 | Ex. 10 | Ex. 11 |
| --- | --- | --- | --- | --- |
| Buna ® CB23 | 100 | 100 | 100 | 100 |
| Perkadox ® BC (DCP) | 0.5 | 0.5 | 0.5 | 0.5 |
| SR 526 (ZDA) | 20 | 30 | 20 | 30 |
| Diphenyliodonium Iodide | — | — | 3 | 3 |
| Zinc Oxide | 5 | 5 | 5 | 5 |
| Barium Sulfate | 19 | 15.7 | 17.1 | 12.9 |
| Atti Compression | 31 | 57 | 27 | 71 |
| CoR @ 125 ft/sec | 0.779 | 0.794 | 0.779 | 0.803 |

Figure 2:
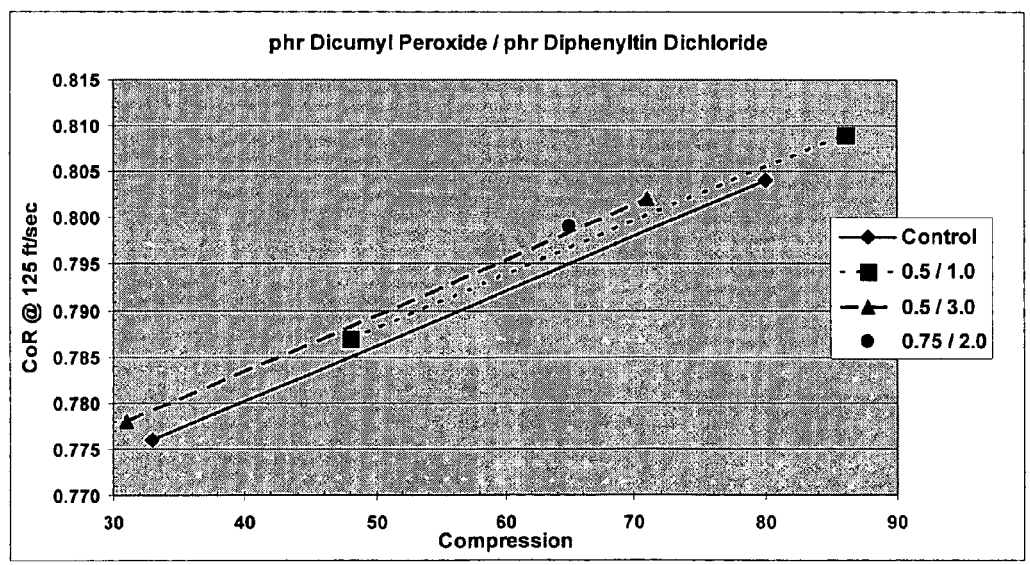
FIG. 2 is a plot comparing golf ball cores formed from compositions comprising diphenyltin dichloride as disclosed herein to control cores with respect to compression and CoR.

Solid cores each having an outer diameter of 1.55 inches were formed from compositions detailed in Table II (ingredient amounts listed in phr) and compared to controls in compression and CoR at 125 ft/sec. The results are listed in Table II below and plotted in FIG. 2, which demonstrate reduced compression and/or enhanced CoR with the addition of diphenyltin dichloride. In general, compositions (e.g., Ex. 13-17) that can provide data points above the extrapolated solid line of the control cores in FIG. 2 are preferred.

TABLE II

|  | Control 3 | Control 4 | Ex. 13 | Ex. 14 | Ex. 15 | Ex. 16 | Ex. 17 |
| --- | --- | --- | --- | --- | --- | --- | --- |
| Buna ® CB23 | 100 | 100 | 100 | 100 | 100 | 100 | 100 |
| Perkadox ® BC (DCP) | 0.5 | 0.5 | 0.5 | 0.5 | 0.5 | 0.5 | 0.75 |
| SR 526 (ZDA) | 20 | 30 | 25 | 35 | 25 | 35 | 30 |
| Diphenyltin Dichloride | — | — | 1 | 1 | 3 | 3 | 2 |
| Zinc Oxide | 5 | 5 | 5 | 5 | 5 | 5 | 5 |
| Barium Sulfate | 19 | 15.7 | 16.5 | 12.3 | 15.5 | 11.4 | 14.0 |
| Atti Compression | 33 | 80 | 48 | 86 | 31 | 71 | 65 |
| CoR @ 125 ft/sec | 0.776 | 0.804 | 0.787 | 0.809 | 0.778 | 0.802 | 0.799 |

Figure 3:
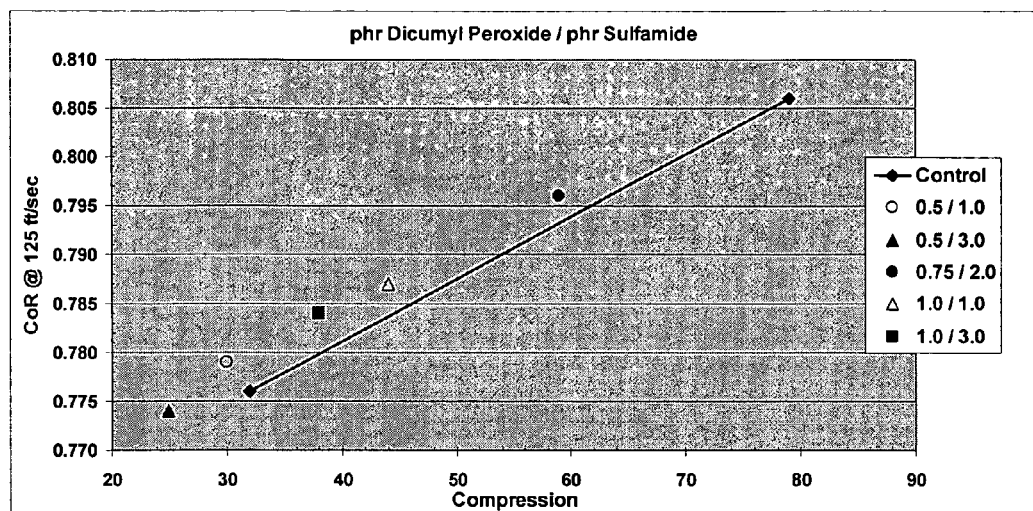
FIG. 3 is a plot comparing golf ball cores formed from compositions comprising sulfamide as disclosed herein to control cores with respect to compression and CoR.

Solid cores each having an outer diameter of 1.55 inches were formed from compositions detailed in Table III (ingredient amounts listed in phr) and compared to controls in compression and CoR at 125 ft/sec. The results are listed in Table III below and plotted in FIG. 3, which demonstrate reduced compression and/or enhanced CoR with the addition of diphenyliodonium iodide. In general, compositions (e.g., Ex. 18-22) that can provide data points above the extrapolated solid line of the control cores in FIG. 3 are preferred.

TABLE III

|  | Control 5 | Control 6 | Ex. 18 | Ex. 19 | Ex. 20 | Ex. 21 | Ex. 22 |
|---|---|---|---|---|---|---|---|
| Buna ® CB23 | 100 | 100 | 100 | 100 | 100 | 100 | 100 |
| Perkadox ® BC (DCP) | 0.5 | 0.5 | 0.5 | 0.5 | 1 | 1 | 0.75 |
| SR 526 (ZDA) | 20 | 30 | 20 | 20 | 20 | 20 | 25 |
| Sulfamide | — | — | 1 | 3 | 1 | 3 | 2 |
| Zinc Oxide | 5 | 5 | 5 | 5 | 5 | 5 | 5 |
| Barium Sulfate | 19 | 15.7 | 18.6 | 17.8 | 18.7 | 17.9 | 16.2 |
| Atti Compression | 32 | 79 | 30 | 25 | 44 | 38 | 59 |
| CoR @ 125 ft/sec | 0.776 | 0.806 | 0.779 | 0.774 | 0.787 | 0.784 | 0.796 |

Figure 4:
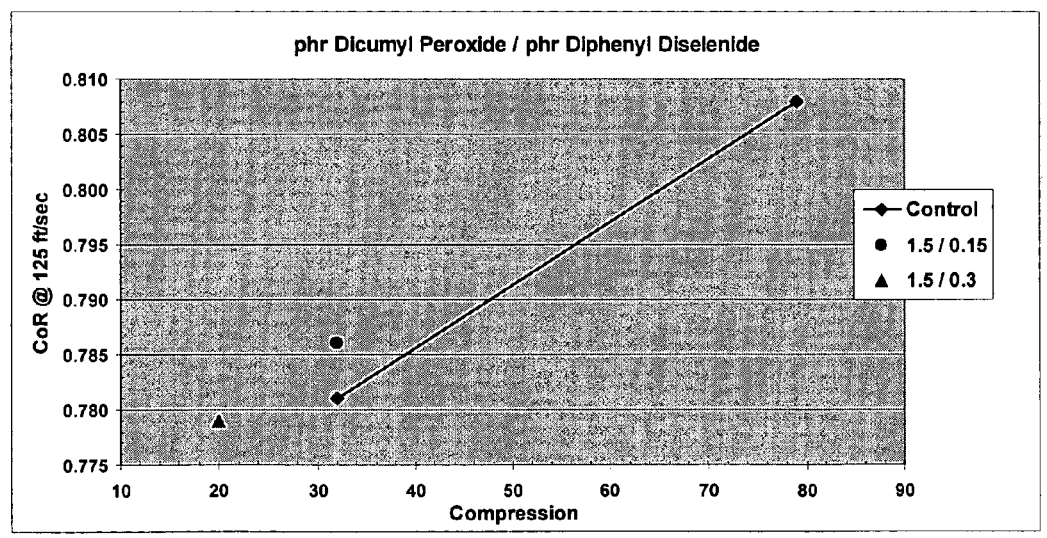
FIG. 4 is a plot comparing golf ball cores formed from compositions comprising diphenyl diselenide as disclosed herein to control cores with respect to compression and CoR.

Solid cores each having an outer diameter of 1.55 inches were formed from compositions detailed in Table IV (ingredient amounts listed in phr) and compared to controls in compression and CoR at 125 ft/sec. The results are listed in Table IV below and plotted in FIG. 4, which demonstrate reduced compression and/or enhanced CoR with the addition of diphenyliodonium iodide. In general, compositions (e.g., Ex. 23 and 24) that can provide data points above the extrapolated solid line of the control cores in FIG. 4 are preferred.

TABLE IV

|  | Control 7 | Control 8 | Ex. 23 | Ex. 24 |
|---|---|---|---|---|
| Buna ® CB23 | 100 | 100 | 100 | 100 |
| Perkadox ® BC (DCP) | 0.5 | 0.5 | 1.5 | 1.5 |
| SR 526 (ZDA) | 20 | 30 | 20 | 20 |
| Diphenyl Diselenide | — | — | 0.15 | 0.3 |
| Zinc Oxide | 5 | 5 | 5 | 5 |
| Barium Sulfate | 19 | 15.7 | 19.1 | 19.0 |
| Atti Compression | 32 | 79 | 32 | 20 |
| CoR @ 125 ft/sec | 0.781 | 0.808 | 0.786 | 0.779 |

Solid cores each having an outer diameter of 1.58 inches were formed of compositions comprising polybutadiene rubber, zinc diacrylate, zinc oxide, dicumyl peroxide, barium sulfate, and color dispersion. One group of cores, representative of conventional technology, was used as control. The two remaining groups of cores were each additionally blended with 5.3 phr Struktol® A95 (contains 2.4 phr pentachlorothiophenol, see Example 1) or 2.4 phr zinc pentachlorothiophenol (see Example 2). The specific compositions for each of the solid cores are presented below in Table V, together with their respective effective modulus, Atti compression, and CoR at 125 ft/sec.

TABLE V

|  | CONTROL | | | EXAMPLE 1 | | | EXAMPLE 2 | | |
|---|---|---|---|---|---|---|---|---|---|
| INGREDIENT | | | | | | | | | |
| polybutadiene rubber | 100 | 100 | 100 | 100 | 100 | 100 | 100 | 100 | 100 |
| zinc diacrylate | 18 | 25 | 30 | 27 | 34 | 41 | 20 | 25 | 30 | 35 |
| dicumyl peroxide | 0.5 | 0.5 | 0.5 | 1.8 | 1.8 | 1.8 | 0.8 | 0.8 | 0.8 | 0.8 |
| Struktol ® A95 PCTP | — | — | — | 5.3 | 5.3 | 5.3 | — | — | — | — |
| zinc salt of PCTP | — | — | — | — | — | — | 2.4 | 2.4 | 2.4 | 2.4 |
| zinc oxide | 26.5 | 24.1 | 22.2 | 5 | 5 | 5 | 5 | 5 | 5 | 5 |
| barium sulfate | — | — | — | 16.2 | 13.4 | 10.6 | 21.7 | 19.7 | 17.7 | 15.7 |
| color dispersion | 0.14 | 0.14 | 0.14 | 0.14 | 0.14 | 0.14 | 0.14 | 0.14 | 0.14 | 0.14 |
| PROPERTY | | | | | | | | | |
| Effective Modulus (psi) | 3800 | 6200 | 8700 | 4100 | 6200 | 7700 | 3600 | 5100 | 7400 | 9700 |
| Atti Compression | 17 | 52 | 76 | 22 | 52 | 67 | 13 | 38 | 65 | 84 |
| CoR @ 125 ft/s | 0.764 | 0.789 | 0.802 | 0.773 | 0.794 | 0.802 | 0.782 | 0.801 | 0.813 | 0.823 |

It is very apparent that the addition of PCTP, in either form, increases CoR, decreases compression, or both, in the core. In particular, the PCTP zinc salt (Example 2) provides comparable CoR's with lower compression and/or increased CoR's with comparable (or lower) compression, both of which are desirable golf ball properties.

The various additives and compositions comprising such additives as disclosed herein may also be used in other golf equipment, in particular, inserts for golf clubs, such as putters, irons, and woods, and in golf shoes and components thereof.

While it is apparent that the illustrative embodiments of the invention disclosed herein fulfill the preferred embodiments of the present invention, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A golf ball comprising a core and at least one layer disposed about the core, wherein the core or the layer is formed from a composition comprising a base polymer, a crosslink initiator, and at least one additive having a structure of

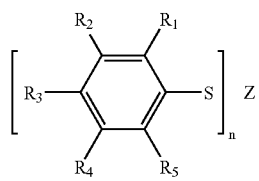

where at least one of $R_1$ to $R_5$ is a perhaloalkyl, (per)halocycloalkyl, or (per)haloaryl substituent; the remainder of $R_1$ to $R_5$ are the same or different organic substituents or hydrogen; Z is a non-metal cation selected from the group consisting of quaternary ammonium, quatenary pyridinium, quaternary quinolinium, (organo)phosphonium, (organo)sulfonium, (organo)oxonium, (organo)iodonium, and (organo)azonium; and n is an integer of 1 or greater.

2. The golf ball of claim 1, wherein at least one of $R_1$, $R_3$, and $R_5$ is a perhaloalkyl substituent having 1 to 6 carbon atoms.

3. The golf ball of claim 2, wherein the perhaloalkyl substituent is selected from the group consisting of trichloromethyl, tribromomethyl, and triiodomethyl.

4. A golf ball comprising a core and at least one layer disposed about the core, wherein the core or the layer is formed from a composition comprising a base polymer, a crosslink initiator, and at least one additive having a structure of

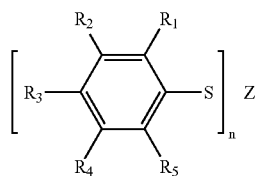

where at least one of $R_1$ to $R_5$ is a perhaloalkyl, (per)halocycloalkyl, or (per)haloaryl substituent; the remainder of $R_1$ to $R_5$ are the same or different organic substituents or hydrogen; n is an integer of 1 or greater; and Z is a trivalent or tetravalent metal selected from the group consisting of Ti, Zr, Cr, Mo, Fe, Co, Rh, Ni, Pd, and Pt.

5. A golf ball comprising at least one layer formed from a composition comprising a base polymer, a crosslink initiator, and at least one additive, wherein the additive has a structure selected from:

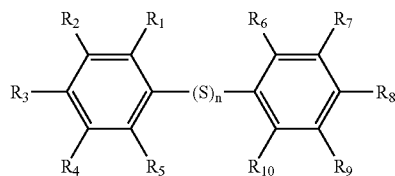

where at least one of $R_1$ to $R_5$ is a (per)haloaryl; the remainder of $R_1$ to $R_5$ are the same or different organic substituents or hydrogen; Z is H or a cation; and n is an integer of 1 or greater; and

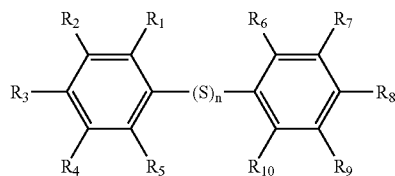

where at least one of $R_1$ to $R_5$ is a (per)haloaryl; at least one of $R_6$ to $R_{10}$ is selected from perhaloalkyls, (per)haloaryls, (per)haloaralkyls, (per)haloalkaryls, and (per)halocycloalkyls; the remainder of $R_1$ to $R_{10}$ are the same or different organic substituents or hydrogen; and n is an integer of 1 or greater.

6. The golf ball of claim 5, wherein the additive has a structure of

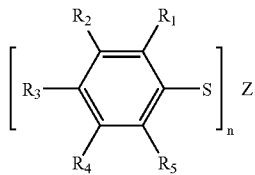

where at least one of $R_1$ to $R_5$ is a (per)haloaryl; the remainder of $R_1$ to $R_5$ are the same or different organic substituents or hydrogen; n is an integer of 1 or greater; and Z is a non-metal cation selected from the group consisting of quaternary ammonium, quaternary pyridinium, quaternary quinolinium, (organo)phosphonium, (organo)sulfonium, (organo)oxonium, (organo)iodonium, and (organo)azonium.

7. The golf ball of claim 5, wherein the additive has a structure of

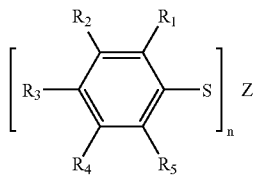

where at least one of $R_1$ to $R_5$ is a (per)haloaryl; the remainder of $R_1$ to $R_5$ are the same or different organic substituents or hydrogen; n is an integer of 1 or greater; and Z is a trivalent or tetravalent metal selected from the group consisting of Ti, Zr, Cr, Mo, Fe, Co, Rh, Ni, Pd, and Pt.

* * * * *